US011025475B2

(12) United States Patent
Liu et al.

(10) Patent No.: US 11,025,475 B2
(45) Date of Patent: Jun. 1, 2021

(54) METHOD, APPARATUS, SERVER, AND SYSTEMS OF TIME-REVERSAL TECHNOLOGY

(71) Applicants: K. J. Ray Liu, Potomac, MD (US); Hung-Quoc Duc Lai, Parkville, MD (US); Beibei Wang, Clarksville, MD (US); Chen Chen, College Park, MD (US); Oscar Chi-Lim Au, San Jose, CA (US)

(72) Inventors: K. J. Ray Liu, Potomac, MD (US); Hung-Quoc Duc Lai, Parkville, MD (US); Beibei Wang, Clarksville, MD (US); Chen Chen, College Park, MD (US); Oscar Chi-Lim Au, San Jose, CA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 141 days.

(21) Appl. No.: 15/861,422

(22) Filed: Jan. 3, 2018

(65) Prior Publication Data

US 2018/0131554 A1    May 10, 2018

Related U.S. Application Data

(63) Continuation-in-part of application No. 14/912,324, filed as application No. PCT/US2014/051148 on
(Continued)

(51) Int. Cl.
*H04L 27/36* (2006.01)
*H04W 72/04* (2009.01)
(Continued)

(52) U.S. Cl.
CPC ............ *H04L 27/362* (2013.01); *H04B 1/38* (2013.01); *H04W 72/0413* (2013.01); *H04L 27/34* (2013.01)

(58) Field of Classification Search
CPC ......... H04L 27/362; H04L 27/34; H04B 1/38; H04W 72/0413
See application file for complete search history.

(56) References Cited

U.S. PATENT DOCUMENTS 2,933,702 A    4/1960    Bogert
3,767,855 A    10/1973    Ueno et al.
(Continued)

FOREIGN PATENT DOCUMENTS

EP    2571214 B1    4/2018
WO    2007/031088 A1    3/2007
(Continued)

OTHER PUBLICATIONS

U.S. Appl. No. 15/004,314, Chen et al., filed Jan. 22, 2016.
(Continued)

*Primary Examiner* — Alex Skripnikov
*Assistant Examiner* — Sharmin Chowdhury

(57) ABSTRACT

The present teaching relates to collecting and processing location-specific wireless waveforms for use in wireless communication, components, methods, apparatuses, servers, and systems. In one embodiment, a disclosed system comprises a first wireless transceiver of a first device, and at least one second wireless transceiver of at least one second device. The first wireless transceiver of the first device is wirelessly coupled to the at least one second wireless transceiver through a wireless multipath channel associated with a space. The first device with the first wireless transceiver comprises a processor and a memory, which are configured to obtain a set of channel information (CI) and perform a task associated with the space based on the set of channel information. The set of channel information is captured when at least one probing signal is either (1) sent from the first wireless transceiver to a particular second wireless transceiver through the wireless multipath channel associated with the space, or (2) sent from the particular second wireless transceiver to the first wireless transceiver through the wireless multipath channel. The set of CI comprises a channel impulse response, a channel frequency (Continued)

response, a channel profile, and/or another channel data of the wireless multipath channel.

20 Claims, 13 Drawing Sheets

Related U.S. Application Data

Aug. 14, 2014, now Pat. No. 9,900,794, application No. 15/861,422, which is a continuation-in-part of application No. 15/004,335, filed on Jan. 22, 2016, now Pat. No. 10,009,148, application No. 15/861,422, which is a continuation-in-part of application No. 15/326,112, filed as application No. PCT/US2015/041037 on Jul. 17, 2015, and a continuation-in-part of application No. 14/605,611, filed on Jan. 26, 2015, now Pat. No. 10,168,414, application No. 15/861,422, which is a continuation-in-part of application No. 15/584,052, filed on May 2, 2017, now Pat. No. 10,447,094, application No. 15/861,422, which is a continuation-in-part of application No. 15/434,813, filed on Feb. 16, 2017, now Pat. No. 10,129,862, application No. 15/861,422, which is a continuation-in-part of application No. PCT/US2017/021963, filed on Mar. 10, 2017, application No. 15/861,422, which is a continuation-in-part of application No. PCT/US2017/021957, filed on Mar. 10, 2017, application No. 15/861,422, which is a continuation-in-part of application No. PCT/US2017/027131, filed on Apr. 12, 2017, and a continuation-in-part of application No. 15/384,217, filed on Dec. 19, 2016, now Pat. No. 10,440,705, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, said application No. 15/384,217 is a continuation-in-part of application No. 14/615,984, filed on Feb. 6, 2015, now Pat. No. 9,686,054, said application No. 15/384,217 is a continuation-in-part of application No. 15/004,314, filed on Jan. 22, 2016, now Pat. No. 10,014,982, said application No. 15/384,217 is a continuation-in-part of application No. 15/061,059, filed on Mar. 4, 2016, now Pat. No. 10,609,711, said application No. 15/384,217 is a continuation-in-part of application No. PCT/US2015/041037, filed on Jul. 17, 2015, and a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, and a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, now Pat. No. 10,327,213, said application No. 15/384,217 is a continuation-in-part of application No. PCT/US2016/066015, filed on Dec. 9, 2016, application No. 15/861,422, which is a continuation-in-part of application No. PCT/US2017/015909, filed on Jan. 31, 2017, and a continuation-in-part of application No. PCT/US2016/066015, filed on Dec. 9, 2016.

(60) Provisional application No. 62/106,395, filed on Jan. 22, 2015, provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/511,309, filed on May 25, 2017, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 6, 2016.

(51) Int. Cl.
*H04B 1/38* (2015.01)
*H04L 27/34* (2006.01)

(56) References Cited

U.S. PATENT DOCUMENTS

| | | |
|---|---|---|
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |

(56) References Cited

U.S. PATENT DOCUMENTS

| | | |
|---|---|---|
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |
| 8,457,217 B2 | 6/2013 | Huy et al. |
| 8,498,658 B2 | 7/2013 | Smith et al. |
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 9,226,304 B2 | 12/2015 | Chen et al. |
| 9,402,245 B2 | 7/2016 | Chen et al. |
| 9,407,306 B2 | 8/2016 | Yang et al. |
| 9,686,054 B2 | 6/2017 | Yang et al. |
| 9,736,002 B2 | 8/2017 | Yang et al. |
| 9,781,700 B2 | 10/2017 | Chen et al. |
| 9,794,156 B2 | 10/2017 | Ma et al. |
| 9,882,675 B2 | 1/2018 | Han et al. |
| 9,883,511 B1 | 1/2018 | Yang et al. |
| 9,887,864 B1 | 2/2018 | Han et al. |
| 2003/0108127 A1* | 6/2003 | Eilts .................... H04L 25/0212 375/340 |
| 2003/0138053 A1 | 7/2003 | Candy et al. |
| 2004/0156443 A1 | 8/2004 | Dent |
| 2006/0098746 A1 | 5/2006 | Candy et al. |
| 2006/0115031 A1 | 6/2006 | Lindskog et al. |
| 2006/0233221 A1 | 10/2006 | Xu |
| 2008/0018521 A1* | 1/2008 | Sahinoglu ................. G01S 7/28 342/27 |
| 2008/0074307 A1* | 3/2008 | Boric-Lubecke ....... G01S 13/56 342/28 |
| 2010/0197264 A1* | 8/2010 | Azadet .................. H04L 1/0631 455/272 |
| 2010/0302977 A1 | 12/2010 | Huy et al. |
| 2010/0309829 A1 | 12/2010 | Huy et al. |
| 2012/0155515 A1 | 6/2012 | Smith et al. |
| 2012/0183037 A1 | 7/2012 | Allpress et al. |
| 2012/0207234 A1 | 8/2012 | De Rosny et al. |
| 2012/0257660 A1* | 10/2012 | Smith .................. H04L 25/0212 375/224 |
| 2012/0263056 A1 | 10/2012 | Smith et al. |
| 2012/0328037 A1 | 12/2012 | Hsu et al. |
| 2013/0039194 A1* | 2/2013 | Siomina .............. H04W 52/244 370/252 |
| 2013/0201958 A1 | 8/2013 | Huy et al. |
| 2013/0223503 A1 | 8/2013 | Smith et al. |
| 2014/0022128 A1 | 1/2014 | Smith |
| 2014/0101312 A1* | 4/2014 | Huang ............... H04L 29/06469 709/225 |
| 2014/0126567 A1 | 5/2014 | Husain et al. |
| 2014/0226594 A1* | 8/2014 | Liu .................... H04L 67/1097 370/329 |
| 2015/0049792 A1 | 2/2015 | Han et al. |
| 2016/0018508 A1 | 1/2016 | Chen et al. |
| 2016/0205569 A1 | 7/2016 | Han et al. |
| 2017/0188359 A1 | 6/2017 | Liu et al. |
| 2017/0212210 A1 | 7/2017 | Chen et al. |
| 2018/0026481 A1 | 1/2018 | Ku et al. |
| 2018/0131554 A1 | 5/2018 | Liu et al. |

FOREIGN PATENT DOCUMENTS

| | | |
|---|---|---|
| WO | 2011/029072 A2 | 3/2011 |
| WO | 2011/029075 A2 | 3/2011 |
| WO | 2012/151316 A1 | 11/2012 |
| WO | 2013/126054 A1 | 8/2013 |
| WO | 2016/011433 A2 | 1/2016 |
| WO | 2017/100706 A1 | 6/2017 |
| WO | 2017/155634 A1 | 9/2017 |
| WO | 2017/156487 A1 | 9/2017 |
| WO | 2017/156492 A1 | 9/2017 |
| WO | 2017/180698 A1 | 10/2017 |

OTHER PUBLICATIONS

U.S. Appl. No. 15/004,335, Chen et al., filed Jan. 22, 2016.
U.S. Appl. No. 15/434,813, Wu et al., filed Feb. 16, 2017.
U.S. Appl. No. 15/061,059, Ma et al., filed Mar. 4, 2016.
U.S. Appl. No. 15/284,496, Han et al., filed Oct. 3, 2016.
U.S. Appl. No. 15/873,806, Zhang et al., filed Jan. 17, 2018.

* cited by examiner

METHOD, APPARATUS, SERVER, AND SYSTEMS OF TIME-REVERSAL TECHNOLOGY

CROSS-REFERENCE TO RELATED APPLICATIONS

The present application hereby incorporates by reference the entirety of the disclosures of, and claims priority to, each of the following cases:

(a) U.S. patent application Ser. No. 14/912,324, entitled "TIME-REVERSAL WIRELESS SYSTEMS HAVING ASYMETRIC ARCHITECTURE," filed on Feb. 16, 2016,
  (1) which is a national stage entry of PCT patent application PCT/US2014/051148, entitled "TIME-REVERSAL WIRELESS SYSTEMS HAVING ASYMETRIC ARCHITECTURE", filed on Aug. 14, 2014, published as WO 2015/023895A1 on Feb. 19, 2015, (b) U.S. patent application Ser. No. 15/004,335, entitled "TIME-REVERSAL TECHNOLOGIES FOR HYBRID WIRELESS NETWORKS," filed on Jan. 22, 2016,
  (1) which claims priority to U.S. Provisional patent application 62/106,395, entitled "TIME-REVERSAL TECHNOLOGIES FOR HYBRID WIRELESS NETWORKS", filed on Jan. 22, 2015, (c) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
    a. which claims priority to U.S. Provisional patent application 62/148,019, entitled "WIRELESS POSITIONING SYSTEMS", filed on Apr. 15, 2015,
    b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795, entitled "TIME-REVERSAL POSITIONING SYSTEMS", filed on Jul. 17, 2014, and
      2. which claims priority to U.S. Provisional patent application 62/069,090, entitled "TIME-REVERSAL POSITIONING SYSTEMS", filed on Oct. 27, 2014, (d) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
  (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016, (e) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
  (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
  (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016, (f) PCT patent application PCT/US2017/021963, entitled "METHODS, APPARATUS, SERVERS, AND SYSTEMS FOR VITAL SIGNS DETECTION AND MONITORING", filed on Mar. 10, 2017,
  (1) which claims priority to U.S. Provisional patent application 62/307,081, entitled "TR-BREATH: TIME-REVERSAL BREATHING RATE ESTIMATION AND DETECTION", filed on Mar. 11, 2016,
  (2) which claims priority to U.S. Provisional patent application 62/316,850, entitled "TR-BREATH: TIME-REVERSAL BREATHING RATE ESTIMATION AND DETECTION", filed on Apr. 1, 2016, (g) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017,
  (1) which claims priority to U.S. Provisional patent application 62/307,172, entitled "RADIO SHOT: THROUGH-THE-WALL HUMAN IDENTIFICATION", filed on Mar. 11, 2016,
  (2) which claims priority to U.S. Provisional patent application 62/334,110, entitled "TIME-REVERSAL TRACKING WITHOUT MAPPING", filed on May 10, 2016, (h) PCT patent application PCT/US2017/027131, entitled METHODS, APPARATUS, SERVERS, AND SYSTEMS FOR OBJECT TRACKING, filed on Apr. 12, 2017,
  (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (2) which claims priority to U.S. Provisional patent application 62/334,110, entitled "TIME-REVERSAL TRACKING WITHOUT MAPPING", filed on May 10, 2016, and
  (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016, (i) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017, (j) U.S. Provisional patent application 62/593,826, entitled "METHOD, APPARATUS, AND SYSTEM FOR OBJECT TRACKING AND NAVIGATION", filed on Dec. 1, 2017, (k) U.S. Provisional patent application 62/511,309, entitled "METHODS, DEVICES, SERVERS, APPARATUS, AND SYSTEMS FOR WIRELESS INTERNET OF THINGS APPLICATIONS", filed on May 25, 2017, (l) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
  (1) which is a Continuation-in-Part of U.S. patent application Ser. No. 13/706,342, entitled "WAVEFORM DESIGN FOR TIME-REVERSAL SYSTEMS," filed on Dec. 5, 2012, (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015,
(3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. patent U.S. Pat. No. 9,559,874 on Jan. 31, 2017,
(4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/0164669A1 on Jun. 9, 2016, issued as U.S. Pat. No. 9,794,156 on Oct. 17, 2017,
(5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
  a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016,
(6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
  a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
    1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
  a. which claims priority to U.S. Provisional patent application 62/069,090, entitled "TIME-REVERSAL POSITIONING SYSTEMS", filed on Oct. 27, 2014,
  b. which claims priority to U.S. Provisional patent application 62/025,795, entitled "TIME-REVERSAL POSITIONING SYSTEMS", filed on Jul. 17, 2014,
(8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
  a. which claims priority to U.S. Provisional patent application 62/025,795, entitled "TIME-REVERSAL POSITIONING SYSTEMS", filed on Jul. 17, 2014,
(9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016,
  a. which claims priority to U.S. Provisional patent application 62/106,395, entitled "TIME-REVERSAL TECHNOLOGIES FOR HYBRID WIRELESS NETWORKS", filed on Jan. 22, 2015,
(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
  a. which claims priority to U.S. Provisional patent application 62/128,574, entitled "TIME-REVERSAL SCALABILITY FOR HIGH NETWORK DENSIFICATION", filed on Mar. 5, 2015,
(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
    1. which claims priority to U.S. Provisional patent application 62/025,795 entitled "TIME-REVERSAL POSITIONING SYSTEMS", filed on Jul. 17, 2014, and
    2. which claims priority to U.S. Provisional patent application 62/069,090 entitled "TIME-REVERSAL POSITIONING SYSTEMS", filed on Oct. 27, 2014,
(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016,
  a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
  b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. patent U.S. Pat. No. 9,781,700 on Oct. 3, 2017,
    1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. patent U.S. Pat. No. 9,402,245 on Jul. 26, 2016,
      i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(13) which is a Continuation-in-Part of U.S. patent application Ser. No. 15/284,496, entitled "TIME-REVERSAL COMMUNICATION SYSTEMS", filed on Oct. 3, 2016, a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,
(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,
   a. which claims priority to U.S. Provisional patent application 62/265,155, entitled "INDOOR EVENTS DETECTION SYSTEM", filed on Dec. 9, 2015,
   b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
   c. which claims priority to U.S. Provisional patent application 62/383,235, entitled "TIME REVERSAL MONITORING SYSTEM", filed on Sep. 2, 2016,
   d. which claims priority to U.S. Provisional patent application 62/307,081, entitled "TR-BREATH: TIME-REVERSAL BREATHING RATE ESTIMATION AND DETECTION", filed on Mar. 11, 2016,
   e. which claims priority to U.S. Provisional patent application 62/316,850, entitled "TR-BREATH: TIME-REVERSAL BREATHING RATE ESTIMATION AND DETECTION", filed on Apr. 1, 2016,
(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,
(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(18) which claims priority to U.S. Provisional patent application 62/307,081, entitled "TR-BREATH: TIME-REVERSAL BREATHING RATE ESTIMATION AND DETECTION", filed on Mar. 11, 2016,
(19) which claims priority to U.S. Provisional patent application 62/316,850, entitled "TR-BREATH: TIME-REVERSAL BREATHING RATE ESTIMATION AND DETECTION", filed on Apr. 1, 2016,
(20) which claims priority to U.S. Provisional patent application 62/307,172, entitled "RADIO SHOT: THROUGH-THE-WALL HUMAN IDENTIFICATION", filed on Mar. 11, 2016,
(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
(22) which claims priority to U.S. Provisional patent application 62/334,110, entitled "TIME-REVERSAL TRACKING WITHOUT MAPPING", filed on May 10, 2016,
(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(24) which claims priority to U.S. Provisional patent application 62/383,235, entitled "TIME REVERSAL MONITORING SYSTEM", filed on Sep. 2, 2016,
(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
(m) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017,
   (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
   (2) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
   (3) which claims priority to U.S. Provisional patent application 62/307,081, entitled "TR-BREATH: TIME-REVERSAL BREATHING RATE ESTIMATION AND DETECTION", filed on Mar. 11, 2016,
   (4) which claims priority to U.S. Provisional patent application 62/316,850, entitled "TR-BREATH: TIME-REVERSAL BREATHING RATE ESTIMATION AND DETECTION", filed on Apr. 1, 2016,
   (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
   (6) which claims priority to U.S. Provisional patent application 62/334,110, entitled "TIME-REVERSAL TRACKING WITHOUT MAPPING", filed on May 10, 2016,
   (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
   (8) which claims priority to U.S. Provisional patent application 62/383,235, entitled "TIME REVERSAL MONITORING SYSTEM", filed on Sep. 2, 2016,
   (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
   (10) which claims priority to U.S. Provisional patent application 62/307,172, entitled "RADIO SHOT: THROUGH-THE-WALL HUMAN IDENTIFICATION", filed on Mar. 11, 2016,
   (11) which claims priority to PCT patent application PCT/US2016/066015, entitled "METHOD, APPARA- TUS, AND SYSTEMS FOR WIRELESS EVENT DETECTION AND MONITORING", filed on Dec. 9, 2016.

TECHNICAL FIELD

This disclosure relates to collecting and processing location-specific wireless waveforms for use in wireless communication, components, methods, apparatuses, servers, and systems.

BACKGROUND

One challenge that may be addressed in the future using novel wireless signaling protocols is high-speed and efficient wireless data transfer to and from huge numbers of potentially closely spaced devices. The demand for high-speed and low-latency wireless communication capabilities has increased dramatically in recent years. It has been projected that by the year 2020, the volume of wireless traffic will rise to about one thousand times that of the year 2010. Supporting these traffic demands will be a challenge for future wireless networks. One challenge will be supporting the huge number of wireless devices with ever-growing demands for higher data rates within the allocated spectrum. Another will be the scheduling delay that is expected to accompany large numbers of coexisting wireless devices competing for network service and the significant deterioration of the user experience in many delay-sensitive applications. Some network users have already started to feel the impact of such delays in places such as airports, conference halls, and stadiums where it is difficult to access the wireless network with hundreds of other devices around. Such poor user experiences may become the norm if new technologies are not introduced to deal with the predicted growth of wireless traffic.

Several technologies have been proposed to tackle this challenge. One straightforward approach is to install more access points (APs) in a given coverage area such that each AP can service a smaller number of terminal devices (TDs) and therefore more traffic can be offloaded to the wired backhaul networks. However, APs that utilize the widely adopted and deployed OFDM protocols can interfere with each other when they are deployed too close together. Sophisticated interference mitigation and resource allocation algorithms may be used to enable the closely spaced APs to accommodate multiple users. For instance, in the IEEE 802.11 (WiFi) standard, the overall available spectrum is 72 MHz in the 2.4 GHz band but adjacent APs may be restricted to utilizing 22 MHz or less of the available spectrum because they may each need to operate in different spectral bands to reduce interference with each other and with the TDs. But this kind of frequency division multiplexing may hinder closely-spaced APs from fully utilizing the available spectrum and therefore supporting the predicted user demands of the future. Moreover, in such schemes, channel planning can be time-consuming and may fail altogether, either because of a lack of communication among multiple APs, or a lack of enough independent spectral bands to support the traffic demands. The system may suffer when APs are added or removed from the network because the channel planning may need to be done all over again. Femtocell networks or device-to-device (D2D) communication networks may suffer from similar issues since the interference between macro- and/or femto- base stations or among multiple femto-base stations or among multiple D2D links need to be coordinated and mitigated by division of the network resources, which may result in reducing the spectral allocation to individual users or cells. Therefore, while installing more OFDM (or similar existing protocol) based access points in a given wireless coverage area may be straightforward and a suitable solution for some applications, this solution alone does not appear to scale well enough to meet the predicted growth in traffic demands of future wireless network capabilities.

Another possible approach is to use multiple-input-multiple-output (MIMO) techniques such as have been incorporated in some existing OFDM based schemes such as WiFi and LTE (Long Term Evolution) to improve the spectral efficiency and/or reduce the scheduling delay of wireless networks. For example, multi-user multiple-input-multiple-output (MU-MIMO) techniques are able to support multiple simultaneous transmissions. However, in addition to the difficulty in operating multiple antennas, the number of supported simultaneous transmissions may be limited. Therefore, this solution alone may not be sufficient for the high network densification challenge described above. Recently, researchers have begun to investigate so-called massive MIMO techniques that use many more antennas than active terminals so that the extra antennas can help focus the wireless signal energy into smaller regions and support some level of spatial multiplexing in addition to frequency multiplexing. While the massive MIMO technique brings some unique benefits beyond the traditional MIMO system, the cost and complexity of implementing these schemes scales up with the number of antennas, which may hinder it from being widely adopted. The principle of utilizing extra antennas can also be applied in distributed antenna systems where some additional antennas are placed close to the users. The wireless signal energy can be focused into a small area through the coordination of the local antennas and thus the system may be able to provide high data rates for certain terminal devices. However, the complexity of the system and of coordinating the antennas grows with the system size, which may limit the scalability of this solution. Therefore, there is a need for wireless communication technologies that can efficiently and cost-effectively meet the ever-increasing demands for wireless access to the internet.

Another candidate solution is the cloud-based radio access networks (C-RAN), where all baseband processing is carried out through high performance computing in a centralized structure, which transforms the evolution of the wireless networks from today's cell-centric architecture into a device-centric architecture. Nevertheless, as with networks densification, the limited front-haul link capacity may prevent the C-RAN from fully utilizing the benefits made possible by concentrating the processing intelligence at the cloud.

Moreover, the operation of a large number of base stations and heterogeneous devices will consume a lot of energy. Therefore, the next generation networks should focus on achieving better energy efficiency and reduce the complexity of user devices as much as possible.

SUMMARY

This disclosure relates to collecting and processing location-specific wireless waveforms for use in wireless communication, components, methods, apparatuses, servers, and systems.

In one embodiment, a disclosed system comprises a first wireless transceiver of a first device, and at least one second wireless transceiver of at least one second device. The first wireless transceiver of the first device is wirelessly coupled to the at least one second wireless transceiver through a wireless multipath channel associated with a space.

The first device with the first wireless transceiver comprises a processor and a memory, which are configured to obtain a set of channel information (CI) and perform a task associated with the space based on the set of channel information. The set of channel information is captured when at least one probing signal is either (1) sent from the first wireless transceiver to a particular second wireless transceiver through the wireless multipath channel associated with the space, or (2) sent from the particular second wireless transceiver to the first wireless transceiver through the wireless multipath channel. The set of CI comprises a channel impulse response, a channel frequency response, a channel profile, and/or another channel data of the wireless multipath channel.

The set of channel information (CI) and/or a quantity computed based on the set of channel information may be stored. They may be stored in the memory of the first device, in a storage device communicatively coupled with the first device, or in a cloud storage device.

The set of channel information (CI) and/or the quantity computed based on the set of channel information may be pre-processed. The pre-processing may be performed in a frequency domain, a time domain, and/or a time-frequency domain.

The set of channel information (CI) and/or the quantity computed based on the set of channel information may be cleaned. The cleaning may be performed in a frequency domain, a time domain, and/or a time-frequency domain.

The set of channel information (CI) and/or the quantity computed based on the set of channel information may be normalized. The normalization may be performed in a frequency domain, a time domain, and/or a time-frequency domain.

The set of channel information (CI) and/or the quantity computed based on the set of channel information may be transmitted to another device, a local server, a cloud server, a server in the cloud, and/or a fog server communicatively coupled with a cloud server. The transmission may be through a network.

In another embodiment, a method of a system comprises obtaining a set of channel information (CI) using a processor and a memory of a first device of the system, and performing a task associated with a space based on the set of channel information. The first wireless transceiver of the first device is wirelessly coupled to at least one second wireless transceiver of at least one second device of the system through a wireless multipath channel associated with the space. The set of channel information is captured when at least one probing signal is either (1) sent from the first wireless transceiver to a particular second wireless transceiver through the wireless multipath channel associated with the space, or (2) sent from the particular second wireless transceiver to the first wireless transceiver through the wireless multipath channel. The set of CI comprises a channel impulse response, a channel frequency response, a channel profile, and/or another channel data of the wireless multipath channel.

In yet another embodiment, a first device of a system comprises a first wireless transceiver, a processor, a memory communicatively coupled with the processor, and a set of instructions stored in the memory. The first wireless transceiver is wirelessly coupled to at least one second wireless transceiver of at least one second device of the system through a wireless multipath channel associated with a space.

The set of instructions, when executed by the processor, causes the first device to obtain a set of channel information (CI) and perform a task associated with the space based on the set of channel information. The set of channel information is captured when at least one probing signal is either sent from the first wireless transceiver to a particular second wireless transceiver through the wireless multipath channel associated with the space, or sent from the particular second wireless transceiver to the first wireless transceiver through the wireless multipath channel. The set of CI may comprise at least one of: a channel impulse response, a channel frequency response, a channel profile, and another channel data of the wireless multipath channel.

Other concepts relate to software for implementing the present teaching on collecting and processing location-specific wireless waveforms for use in wireless communication, components, methods, apparatuses, servers, and systems.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
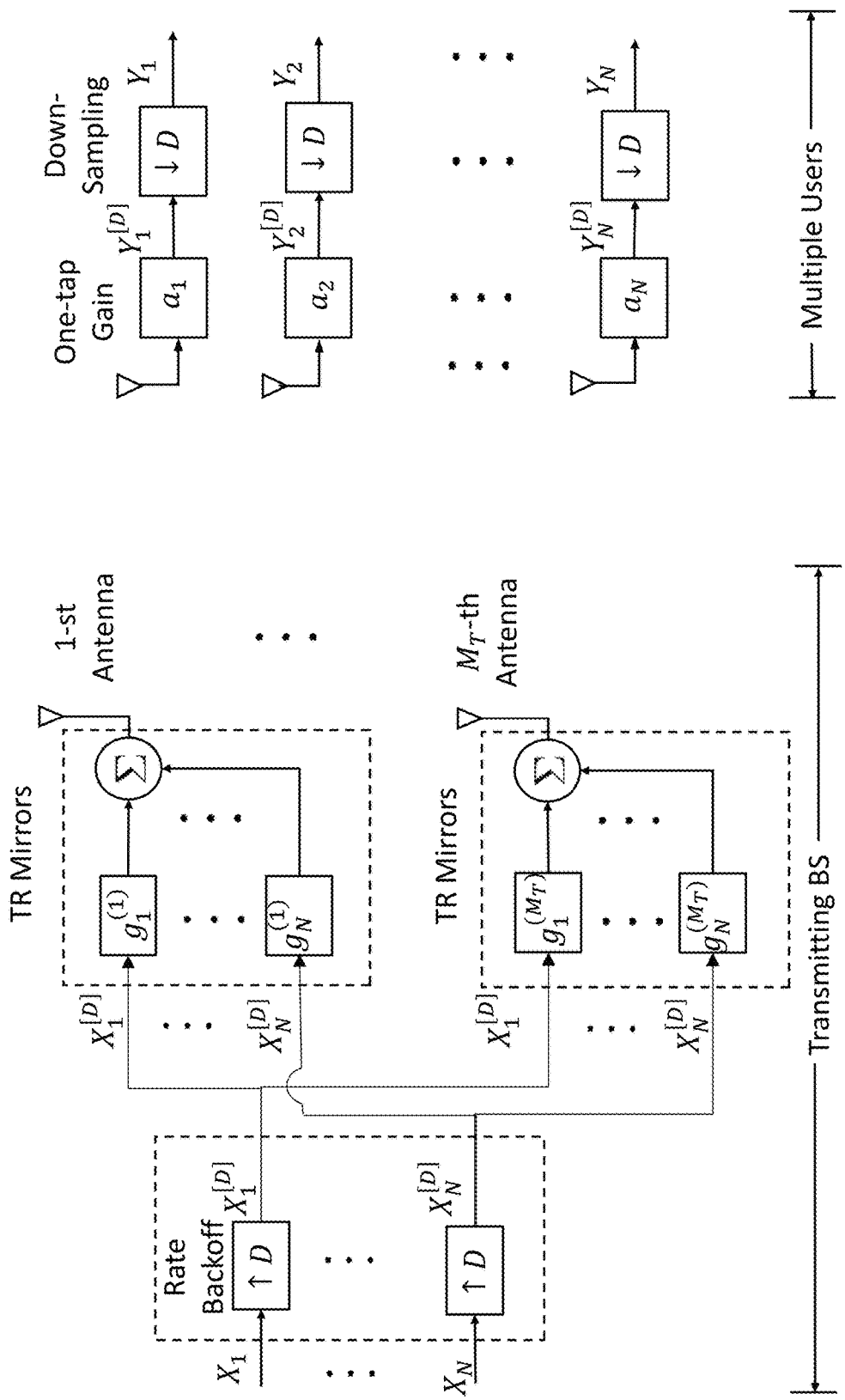
FIG. 1 is a block diagram of a multiple-input single-output (MISO) Time Reversal Division Multiple Access (TRDMA) downlink system, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, a time-reversal system comprises a first wireless transceiver of a time-reversal client, one or more second wireless transceiver and/or a time-reversal client with the first wireless transceiver. The first wireless transceiver of the time-reversal client is wirelessly coupled to the one or more second wireless transceiver through a wireless broadband multipath channel associated with a space. The time-reversal client contains the first wireless transceiver. The time-reversal client also contains a processor and a memory configured to obtain a set of channel state information (CSI) in a channel probing phase, and/or to obtain a set of location-specific signatures based on the set of CSI and/or a time reversal operation in a channel probing phase. The set of CSI is captured when one or more probing signal is sent either from the first wireless transceiver to each of the at least one second wireless transceiver, or from each of the at least one second wireless transceiver to the first wireless transceiver, through the wireless broadband multipath channel associated with the space. A channel passband with bandwidth W0 is associated with the wireless broadband multipath channel. A first passband with bandwidth W1 is associated with the first wireless transceiver. The W1 is not larger than W0 such that the first passband is part of the channel passband. One or more second passband is associated with the one or more second wireless transceiver such that a bandwidth W2 associated with each of the one or more second passband is not larger than W1 such that the each of the one or more second passband is part of the first passband. Each of the set of CSI includes a channel impulse response, a channel frequency response, and/or another channel state data of the wireless broadband multipath channel.

In a data transmission phase, the time-reversal client may use the processor and the memory to determine that one or more information sequence is intended to be transmitted each to respective second wireless transceiver. The time-reversal client may up-sample the one or more information sequence, each based on respective second passband with bandwidth W2 associated with respective second wireless transceiver and/or the first passband with bandwidth W1. The time-reversal client may generate one or more downlink signal each based on respective up-sampled information sequence and/or respective location-specific signature associated with respective second wireless transceiver. The time-reversal client may obtain a combined downlink signal associated with the first passband with bandwidth W1 by adding the at least one downlink signal. The time-reversal client may generate a combined radio frequency (RF) signal with passband being the first passband with bandwidth W1 based on the combined downlink signal. The time-reversal client may transmit the combined RF signal from the first wireless transceiver to the one or more second wireless transceiver through the wireless broadband multipath channel associated with the space such that respective downlink signals focus at respective second wireless transceivers. A particular second wireless transceiver with a particular second passband with bandwidth W2, in the data transmission phase, may receive a received signal which is the combined downlink signal bandlimited to the particular second passband with bandwidth W2. The particular second transceiver may gain-adjust the received signal. The particular second wireless transceiver may down-sample the gain-adjusted received signal based on the particular second passband with bandwidth W2 to extract information sequence intended for the particular second wireless transceiver.

In the data transmission phase, the time-reversal client may generate the one or more downlink signal, with each based on the respective up-sampled information sequence and/or respective downlink waveform associated with respective second wireless transceiver. The downlink waveform may be chosen to maximize a weighted sum of downlink data rate associated with all of the one or more second wireless transceiver. The respective downlink waveform may be chosen based on the set of CSI, the time reversal operation on the set of CSI, and/or an iterative optimization of downlink waveforms and/or downlink power allocation for all downlinks to the at least one second wireless transceiver under total power constraint of the first wireless transceiver.

In the data transmission phase, one or more second wireless transceiver may each send an uplink information sequence wirelessly to the first wireless transceiver through the wireless broadband multipath channel associated with the space simultaneously. The time-reversal client may obtain a received combined signal containing the one or more uplink information sequence from the one or more second wireless transceiver. The time-reversal client may determine each respective uplink information sequence from respective second wireless transceiver based on a convolution of the received combined signal and the respective set of location-specific signature associated with the respective second wireless transceiver.

In the data transmission phase, two second wireless transceivers may each send an information sequence wirelessly to the first wireless transceiver through the wireless broadband multipath channel associated with the space simultaneously. The time-reversal client may, in the data transmission phase, obtain a received combined signal containing the two information sequences from the two second wireless transceivers. The time-reversal client may determine two initial estimated information sequences each associated with respective second wireless transceiver. The determination may be based on a convolution of the received signal and the respective set of location-specific signature associated with the respective second wireless transceiver. The time-reversal client may determine interference based on at least one of the two initial estimated information sequences. The time-reversal client may determine a refined estimated information sequence associated with a particular one of the two second wireless transceivers by canceling the interference from the information sequence of the particular second wireless transceiver.

A particular second wireless transceiver may send a particular probing signal to the first wireless transceiver through the wireless broadband multipath channel associated with the space. The particular probing signal may contain two parts: a preamble and a training sequence, both known to the first wireless transceiver and the particular second wireless transceiver. In the channel probing phase, the first wireless transceiver may receive the particular probing signal. The first wireless transceiver may synchronize with the particular probing signal by determining a synchronization index based on the preamble of the particular probing signal. The first wireless transceiver may identify the training sequence of the particular probing signal based on the synchronization index and the known preamble. The first wireless transceiver may determine a particular CSI. The first wireless transceiver may generate a particular location-specific signature waveform for the particular second wireless transceiver based on time reversing the particular CSI. In a data transmission phase, the first wireless transceiver may generate a transmission signal based on an information sequence and the particular location-specific signature waveform.

In the data transmission phase, the time-reversal client may generate the one or more downlink signal based on quadrature amplitude modulation (QAM).

A third wireless transceiver of another time-reversal client may be wirelessly coupled with the particular second wireless transceiver and/or another wireless transceiver, through another wireless broadband multipath channel associated with another space in a vicinity of the space. A third passband with bandwidth W3 may be associated with the third wireless transceiver. In the data transmission phase, the third wireless transceiver of the another time-reversal client may transmit another RF signal with passband being the third passband with bandwidth W3 to the particular second wireless transceiver and/or another wireless transceiver, through the another wireless broadband multipath channel associated with the another space in the vicinity of the space. The third passband with bandwidth W3 may overlap the first passband of the first wireless transceiver at an overlap band such that the first wireless transceiver and the third wireless transceiver may transmit in the same overlap band simultaneously.

The W3 may be equal to W1 and the third passband of the third wireless transceiver may be identical to the first passband of the first wireless transceiver such that the first wireless transceiver and the third wireless transceiver may transmit in the same passband simultaneously.

One or more third wireless transceiver wirelessly may be coupled with the first wireless transceiver of the time-reversal client through the wireless broadband multipath channel associated with the space. All of the one or more second wireless transceivers and/or all of the at least one third wireless transceivers may have the same passband with bandwidth W2. Each location-specific signature may be associated with a CSI. The channel probing phase may be a training phase of a positioning task to capture the set of location-specific signature associated with a set of locations. An instantaneous location of each of the one or more third wireless transceiver may be determined in an operating phase of the positioning task based on an instantaneous set of CSI and/or the location-specific signatures obtained in the training phase of the positioning task each associated a location in the space. In the training phase, the at least one second wireless transceiver with identical passband with bandwidth W2 may be moved to different locations in the space to capture, for each location, at least one CSI and at least one corresponding location-specific signature. In the operating phase, each of the one or more third wireless transceiver is moved along a path in the space. In the operating phase, the time-reversal client may be further configured to obtain the instantaneous set of CSI captured when one or more probing signal is sent from the first wireless transceiver and/or each of the at least one third wireless transceiver at a location of the path, to the each of the at least one third wireless transceiver at the location of the path and/or the first wireless transceiver, through the wireless broadband multipath channel associated with the space. The time-reversal client may compare the instantaneous set of CSI with the set of location-specific signatures using a similarity metric to identify the location of the path as a location associated with a matching location-specific signature.

In the data transmission phase, the time-reversal client may determine using the processor and the memory that at least one sequence of data symbols is intended to be transmitted to the at least one respective second wireless transceiver. The time-reversal client may estimate inter-symbol interference (ISI) experienced by the one or more second wireless transceiver when the one or more sequence of data symbols are received by the one or more second wireless transceiver. The time-reversal client may modify the at least one sequence of data symbols based on respective channel information and/or the estimated ISI to reduce the ISI experienced by the one or more second wireless transceiver. The time-reversal client may generate one or more downlink signal based on the one or more sequence of modified data symbols and one or more respective signature waveform. The time-reversal client may generate a combined RF signal based on the one or more downlink signal. The time-reversal client may transmit the combined RF signal from the first wireless transceiver to the one or more second wireless transceiver through the wireless broadband multipath channel associated with the space such that respective downlink signals may focus at respective second wireless transceivers.

The time-reversal system may include a controller to control an operation of the time-reversal client. The time-reversal client may support a time-reversal division multi-access protocol and/or at least one other wireless communication protocol.

There may be one or more second wireless transceivers. The one or more second wireless transceivers may be heterogeneous such that the CSI associated with the one or more heterogeneous second wireless transceivers may be heterogeneous and/or the location-specific signatures may be heterogeneous. The time-reversal client may further include an analog-to-digital convertor circuit with a sampling frequency determined based on the channel passband bandwidth W0. In the data transmission phase, the time-reversal client may be configured to receive using the first wireless transceiver a combined RF signal comprising two or more heterogeneous RF signals from the two or more second heterogeneous wireless transceivers. The time-reversal client may determine a sequence of heterogeneous data symbols associated with each of the one or more second heterogeneous wireless transceivers. The determination may be based on the received combined RF signal, the heterogeneous location-specific signatures, a heterogeneous second wireless transceiver bandwidth, and a heterogeneous second wireless transceiver center frequency.

In the data transmission phase, the time-reversal client may be configured to receive a first signal transmitted from a particular second wireless transceiver to the first wireless transceiver through the wireless broadband multipath channel associated with the space. The first signal may comprise a preamble and a data frame. The preamble may include a known code sequence. The data frame may include a plurality of data symbols. The time-reversal client may compute a second signal that represents an estimated equivalent channel response using the received first signal and the known code sequence. The time-reversal client may down-sampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In the data transmission phase, a particular second wireless transceiver may receive a first signal transmitted from the first wireless transceiver to the particular second wireless transceiver through the wireless broadband multipath channel associated with the space. The first signal may comprise a preamble and a data frame. The preamble may include a known code sequence and the data frame may include a plurality of data symbols. The time-reversal client may compute a second signal that represents an estimated equivalent channel response using the received first signal and/or the known code sequence. The time-reversal client may down-sampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In another embodiment, a time-reversal system comprises M second wireless transceivers each at a different second location and each with $N_m$ number of passbands, $m=1, \ldots, M$, each passband having a bandwidth and a center frequency, and K first wireless transceivers of a time-reversal client each at a different first location and each configured to receive at least one of the passbands of bandwidth $b_{m,n,k}$ of the M second wireless transceivers, $m=1, \ldots, M, n=1, \ldots, N, k=1, \ldots, K$, with K, M and $N_m$ being integers greater than zero. Each of the M second wireless transceivers is wirelessly coupled with each of the K first wireless transceivers through a wireless broadband multipath channel associated with a space. The time-reversal client with the K first wireless transceivers includes a processor and a memory. The time-reversal client is configured to receive signals from the at least one of the passbands of the M second wireless transceivers. The time-reversal client is configured to compare information derived from the received signals from the at least one of the passbands of the M second wireless transceivers received by the K first wireless transceivers with. The time-reversal client is configured to determine information about an arrangement of macroscopic objects in the space based on the comparison. The time-reversal client is configured to generate an output based on the determined information. The system has a collective bandwidth B greater than 50 MHz, wherein $B=\Sigma_{m=1}^{M}\Sigma_{n=1}^{N_m}\Sigma_{k=1}^{K_b} b_{m,n,k}$, and wherein the derived information that is compared to the information in the database spans the collective bandwidth.

In one embodiment, the time-reversal (TR) system may be used to monitor the space. In the monitoring phase, the TR system may continuously sense the environment (with the bot, e.g. second wireless transceiver, continuously sending a series of probing signals to the origin, e.g. first wireless transceiver so that the origin can capture CSI continuously in real time) and collect CSI.

During the monitoring phase, the TR system may determine among multiple alert states, such as normal state (e.g. "all doors close", "safe", "no activity", etc.), other targeted alert states (e.g. "front door open", "front door close", "front door half open", "back door open", "back screen door half open", "front window open", "human activity detected", "motion detected", etc.), and default alert states (e.g. "abnormal but unknown", "something abnormal", "some activity").

In a training phase (basically a channel probing phase), reference models/statistics/parameters (e.g. of CSI, some behavior/dynamics/features of CSI) associated with each alert state are collected and stored. In the training phase, the user may put the environment into various alert states (e.g. by opening the front door to certain extent, moving the back door, opening the window, etc.) and signal the TR system to capture the CSI associated with the alert state. The training may also be manual, semi-automatic or automatic. Inputs from other security/monitoring system (e.g. vision based, motion-sensor based, infra-red sensor based, ultra-sound based, touch sensor based, laser based, etc.) may be used to guide the training. Some past training may be used. The training may be query based with the system capturing CSI actively and asking simple questions to the user as to which alert state the TR system is in. The reference models/statistics/parameters may be used in the monitoring phase to determine among the multiple alert states.

However, the reference models/statistics/parameters may become less accurate/precise/relevant over time as the environment (in the space) change over time. As a result, the reference models/statistics/parameters may be updated over time. The update may be automatic (without user input), semi-automatic (with partial user input), and/or manual (with full user input similar to the initial training in the training phase.

The update may include collecting CSI in a particular alert state (e.g. the normal state, the "all doors close" state, etc.) and analyzing its temporal trend. A first-in-first-out (FIFO) buffer may be used to store N number of CSI in the immediate past. The stored CSI may be consecutive CSI over time. The stored CSI may be consecutive significant CSI (which may not be consecutive over time). When the buffer is full, the newest CSI may replace the oldest CSI in a FIFO manner. The reference models/statistics/parameters associated with the current alert state (i.e. the particular alert state, e.g. "all doors close" state) may be updated periodically. The reference models/statistics/parameters associated with the current alert state may also be updated whenever a significant (e.g. big enough) change in CSI behavior is detected. The update may use the CSI in the FIFO buffer as some of the training data. The update may use past statistics/trends in the recent past, distant past, etc.

Here is an example of "significant change in CSI behavior". The instantaneous information of the CSI in the FIFO (e.g. the newest CSI, an average of two or more CSI, some statistics of some of the CSI, etc.) may be compared with some old CSI (e.g. some reference/typical/representative CSI used in the training of the current reference models/statistics/parameters). Some similarity measure (e.g. Time-reversal resonance strength, TRRS, MSE, MAE, etc.) may be computed. If the similarity measure satisfies a certain condition (e.g. TRRS smaller than a threshold), it may be considered "unusual" and may constitute a "significant change in CSI behavior" and may trigger or cause to trigger an update. To prevent false alarm due to noise, multiple consecutive "unusual" behavior may be needed to constitute a "significant change in CSI behavior". Majority voting may be applied over a sliding window. Multiple level of majority voting may be used. Median filtering, denoising, or impulsive behavior removal may be applied to a train of similarity measure, or a train of consecutive "unusual" behavior.

In periodic updating, the following may be applied periodically (e.g. at the end of each period). The FIFO buffer may be checked for fullness and/or consistency. Updating may be applied if (1) the CSI in the FIFO buffer is consistent. Updating may be applied if (2) the FIFO buffer is sufficiently full (e.g. 80% full) with sufficient amount of CSI for training. Updating may be applied if both conditions (1) and (2) are satisfied. The CSI in the FIFO buffer may be considered consistent if a variance of the CSI is smaller than a threshold, or if a maximum pairwise distance of the CSI is smaller than a threshold. Regardless of the decision whether to update or not, the FIFO buffer may be flushed (emptied) to prepare for new CSI collection for the next period. If no updating is performed, the TR system may alert the user that automatic updating failed. The TR system may alert the user that manual retraining may be advised and/or needed.

When the TR system switches to another alert state (e.g. from "all doors closed" to "front door open"), the FIFO buffer may be flushed (emptied) and be used to store CSI in the new alert state (e.g. "front door open").

Updating may be applied to selected alert state only (e.g. normal state, "all doors close").

FIG. 1 shows a block diagram of a multiple-input single-output TRDMA downlink system according to an exemplary embodiment, in which there are N users (or also referred to as receivers) receiving statistically independent messages $\{X_1[k], X_2[k], \ldots, X_N[k]\}$ from a base station, via wireless channels. The base station includes a conversion module and the time reversal mirror (TRM) comprising plural TRMs. The TRM shown in FIG. 1 is a device that can record and time-reverse (and conjugate if complex-valued) a received waveform, which will be used to modulate the time-reversed waveform with an input signal by convolving them together in the following transmission phase. During the channel probing phase, the N intended users first take turns to transmit an impulse signal to the BS. Meanwhile, the TRMs at the BS record the channel response of each link and store the time-reversed and conjugated version of each channel response for the transmission phase. After the channel probing phase, the transmission phase is initiated. At the BS, each of $\{X_1[k], X_2[k], \ldots, X_N[k]\}$ f represents a sequence of information symbols that are independent complex random variables. The rate back-off factor D is introduced as the ratio of the sampling rate to the baud rate, by performing up-sampling and down-sampling with a factor D at the rate conversion module of the BS and the rate conversion module at the receivers. These sequences are first up-sampled by a factor of D at the rate conversion module of the BS. Then the up-sampled sequences are fed into the bank of TRMs. After that, all the outputs of the TRM bank are added together at adder and then the combined signal is transmitted into wireless channels. The signal energy is concentrated in a single time sample and the i-th receiver simply performs a one-tap gain adjustment to the received signal using the adjustment module to recover the signal and then down-samples it with the same factor D using the rate conversion module, ending up with $\{Y_i[k]\}$.

Figure 2:
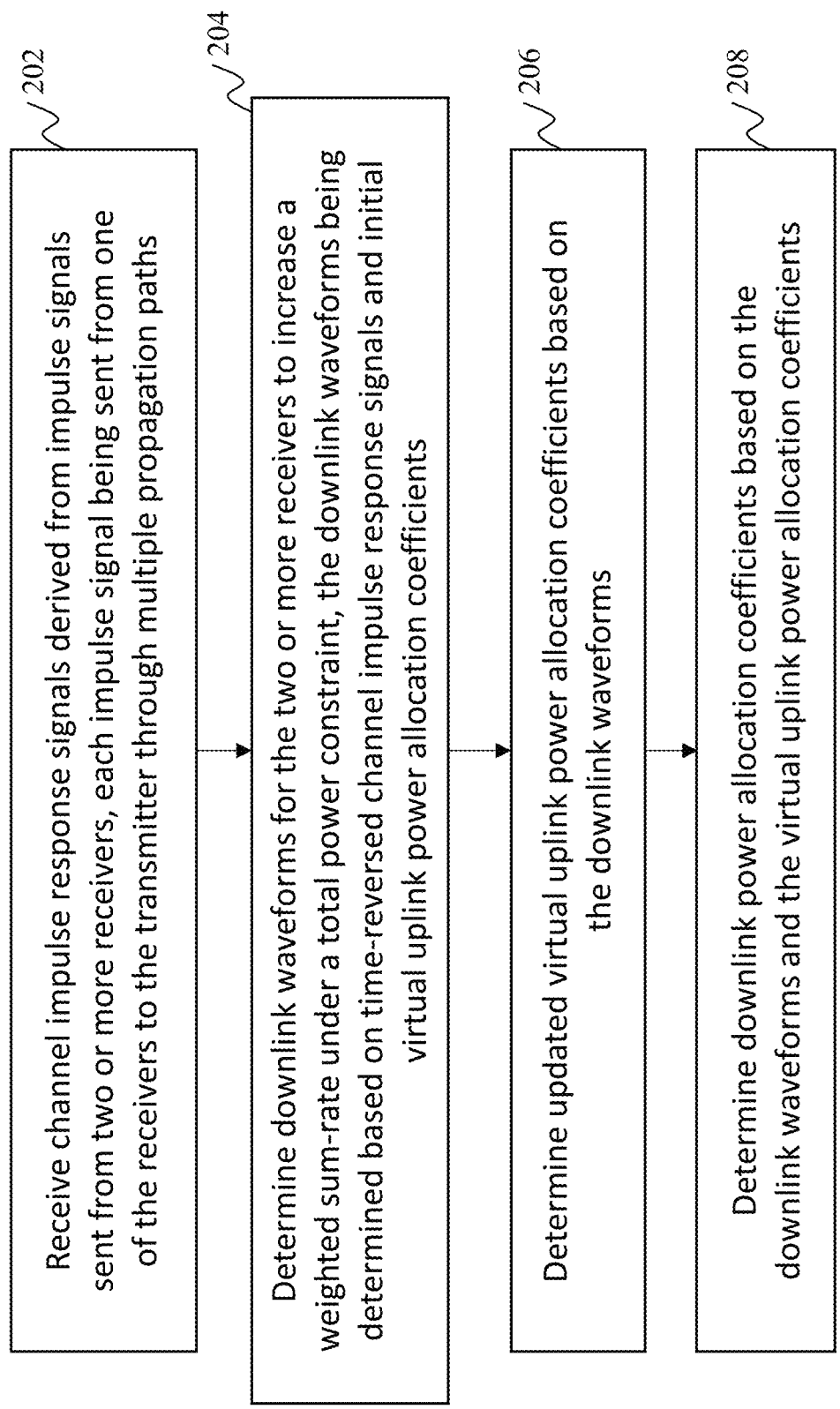
FIG. 2 is a flowchart of an exemplary procedure for implementing iterative weighted sum rate optimization for waveform design in a Time Reversal Division Multiple Access system, according to an embodiment of the present teaching.

FIG. 2 is a flowchart of an exemplary procedure for implementing an iterative weighted sum rate optimization in a TRDMA downlink system. At step 202, a transmitter receives channel impulse response signals derived from impulse signals sent from two or more receivers, each impulse signal being sent from one of the receivers to the transmitter through multiple propagation paths. At step 204, downlink waveforms for the two or more receivers are determined so as to increase a weighted sum-rate under a total power constraint, the downlink waveforms being determined based on time-reversed channel impulse response signals and initial virtual uplink power allocation coefficients. Updated virtual uplink power allocation coefficients are determined at step 206 based on the downlink waveforms. Downlink power allocation coefficients are determined at step 208 based on the downlink waveforms and the virtual uplink power allocation coefficients.

Figure 3:
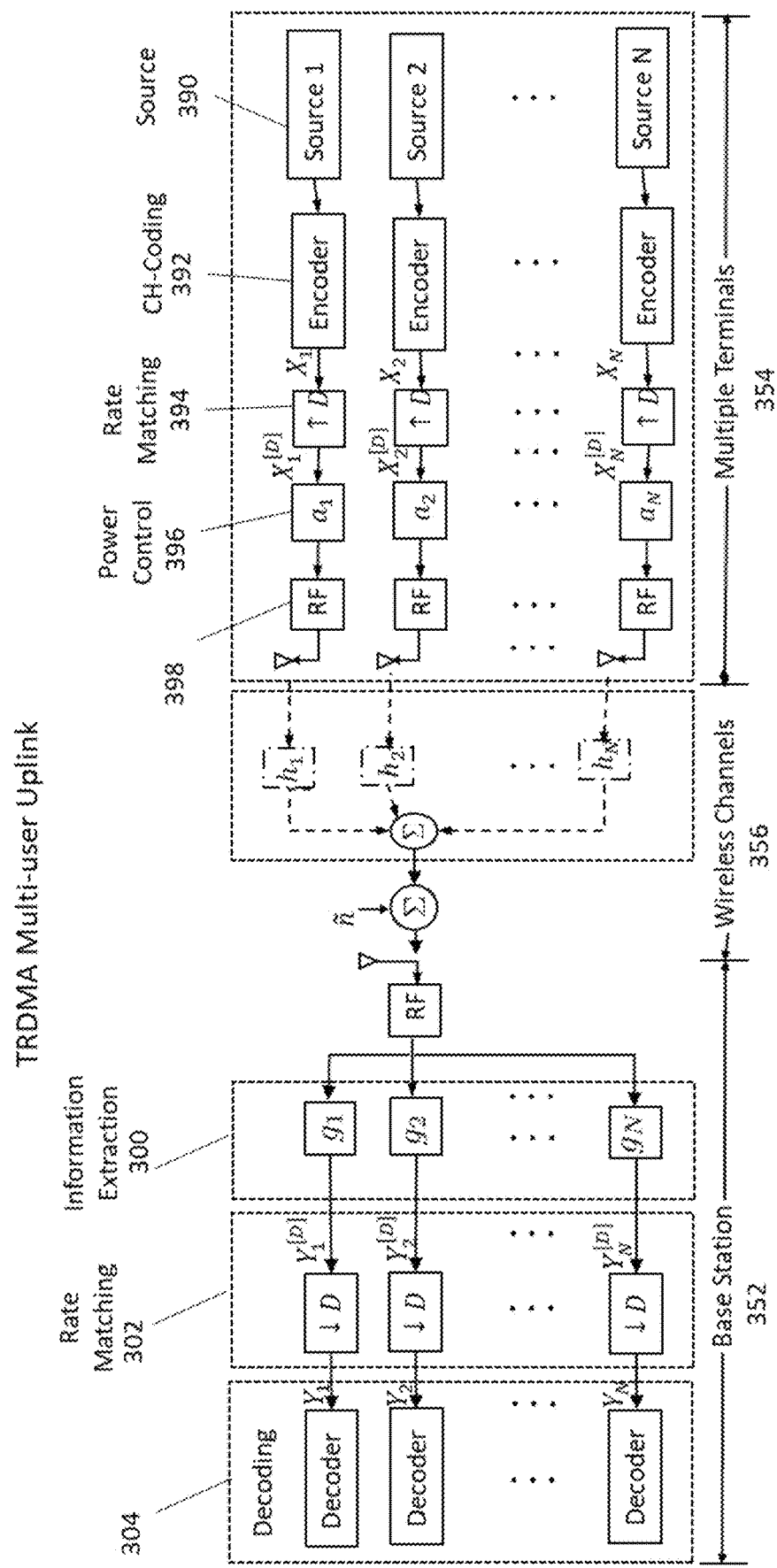
FIG. 3 is a diagram showing an uplink transmission process in a Time Reversal Division Multiple Access system, according to an embodiment of the present teaching.

Referring to FIG. 3, for the uplink, assume the N users transmit their own data to the base station concurrently. Each user has its own information source which is independent of others. At each user, the information bits are first encoded by the channel coding block. Then the coded symbols $\{X_i[k]\}$ are upsampled by the rate back-off factor D for rate matching at the rate matching module. The scaling factors $\{a_i\}$ are used to implement the power control at the power control module. After multiplying with scaling factor, the sequence of $a_i\{X_i^{[D]}[k]\}$ is transmitted by the RF module. When the sequence $a_i\{X_i^{[D]}[k]\}$ propagates through its wireless channel $\{h_i[k]\}$, the convolution between $a_i\{X_i^{[D]}[k]\}$ and the channel impulse response $\{h_i[k]\}$ is automatically taken as the channel output for the i-th user. Since each user's multipath channel response is unique, the automatic convolution between the $a_i\{X_i^{[D]}[k]\}$ and $\{h_i[k]\}$ is automatically equivalent to the base station's signature embedding process in the downlink. All of the channel outputs for the N users are mixed together in the air plus the additive noise at the base station. Upon receiving the mixed signal, the base station passes this mixed signal through an information extraction module that includes a filter bank of the calculated signature waveforms $h_i$, each of which performs the convolution between its input signal and the corresponding user's signature waveform. Such a convolution using the signature waveform extracts the useful signal component and suppresses the signals of other users. The rate matching is performed by down-sampling (with the same factor D) the filter bank's output signal at the rate matching module to recover the original symbol of each user. Based on $\{Y_i[k]\}$, an estimation about $\{X_i[k]\}$ is made. Then the estimated/reconstructed symbol sequence is fed into the corresponding decoder to recover the information bits from each user at the base station.

In some embodiments, a transceiver, a type 1/2 transceiver/device, transmitter, or receiver may be termed as Origin, or Bot. Channel state information may also be termed as channel information. In some embodiments, the first device may be an "Origin", and the second device may be a "Bot". Alternatively, the first device may be a Bot while the second device may be an Origin. One or more bot may be wirelessly coupled with an Origin. One or more Origin may be wirelessly coupled with a Bot. Settings (e.g. power setting, sensitivity setting, etc.) of different Bots may be different. Setting of different Origins may be different. By adjusting the settings, different Bots (or Origins) may have different "effective coverage region". For example, the setting of one Bot (or Origin) may be adjusted to cover a large region (e.g. it may respond to activities in a large area including living room, family room and dining room) while settings of another Bot (or Origin) may adjusted to cover a smaller region (e.g. it may respond to a small bedroom). Localized observations/readings/information may be obtained in each local covered region associated with each Bot/Origin. By combining input/output of different Bots (or Origins), an activity map may be obtained. For example, a house may have 4 Bots. Bot1 may cover the entrance, the living room and the family room of the house. Bot2 may cover kitchen, dining room, and a first rest room of the house. Bot3 may cover the master bedroom and the accompanying second rest room. Bot4 may cover two other bedrooms and a third rest room. When user1 enters a house in California at 6 pm, Bot1 may show "activity" of some kind while the other Bots may show "no-activity". An activity map may be generated. The map (or animation based on the map, or related messages, or related audio/speech description, or related display) may be viewed/listened/observed at real-time (e.g. at 6 pm, slightly after 6 pm due to a small system delay, etc.) or offline (e.g. stored, viewed afterwards at 11 pm, or the next day). It may be viewed/listened/observed by user1 or other users (such as user2 still on the way home via combined home WiFi/broadband internet/mobile network/car network, user3 being in New York, user3 in the neighborhood via a neighborhood network, user4 in another country via internet, user5 in one of the bedrooms via home network/WiFi/mesh network/Bluetooth network) using smart phones, tablets, mobile devices, computers, notebooks, laptops, smart devices, smart watches, smart speaker, smart refrigerators, smart appliances, etc.

When user1 walks from living room to kitchen at around 7 pm, the Bot1 activity may die down while activity of some kind may start to be detected, while Bot3 and Bot4 may show no-activity. The display/message/description/animation may be updated in real time, or can be stored and observed/viewed/listened at a later time.

Figure 4A:
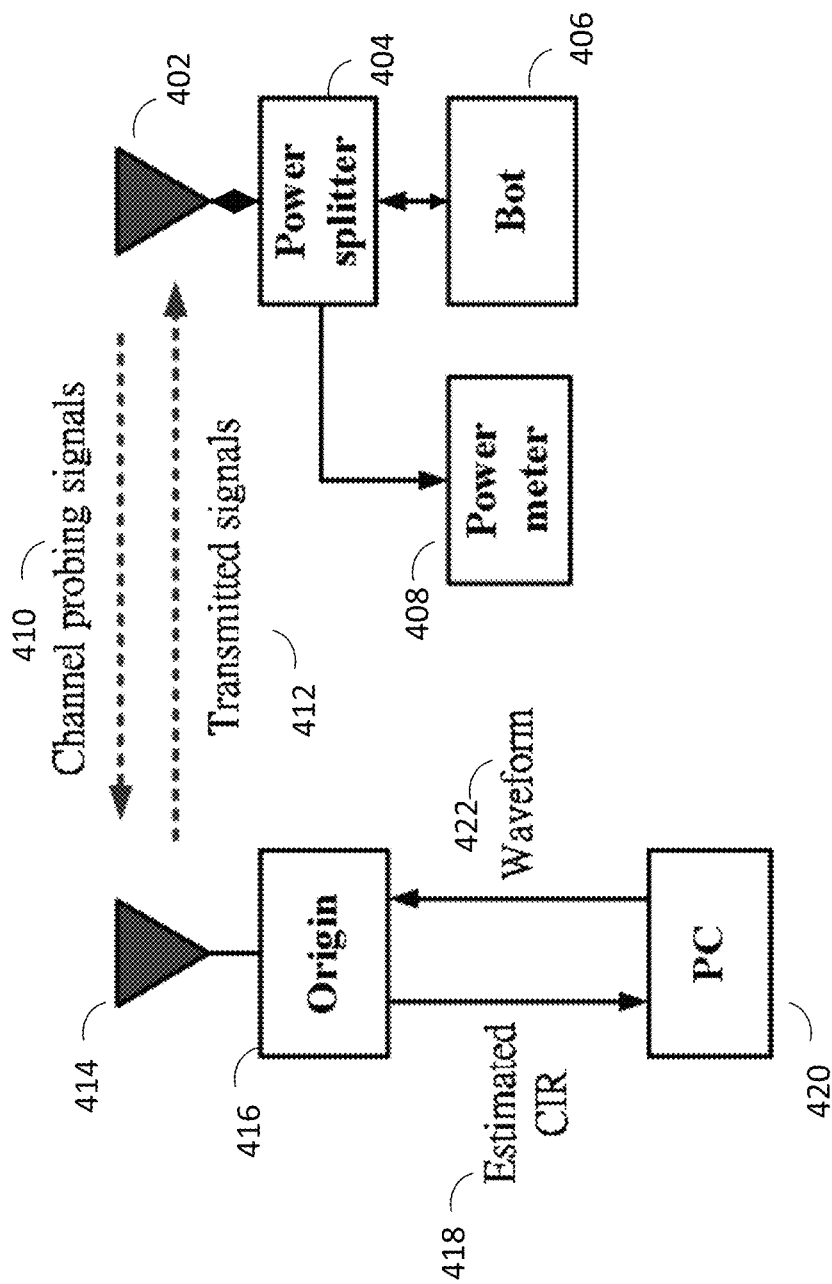
FIG. 4A shows a block diagram of an experimental power measurement set-up, according to an embodiment of the present teaching.
Figure 4B:
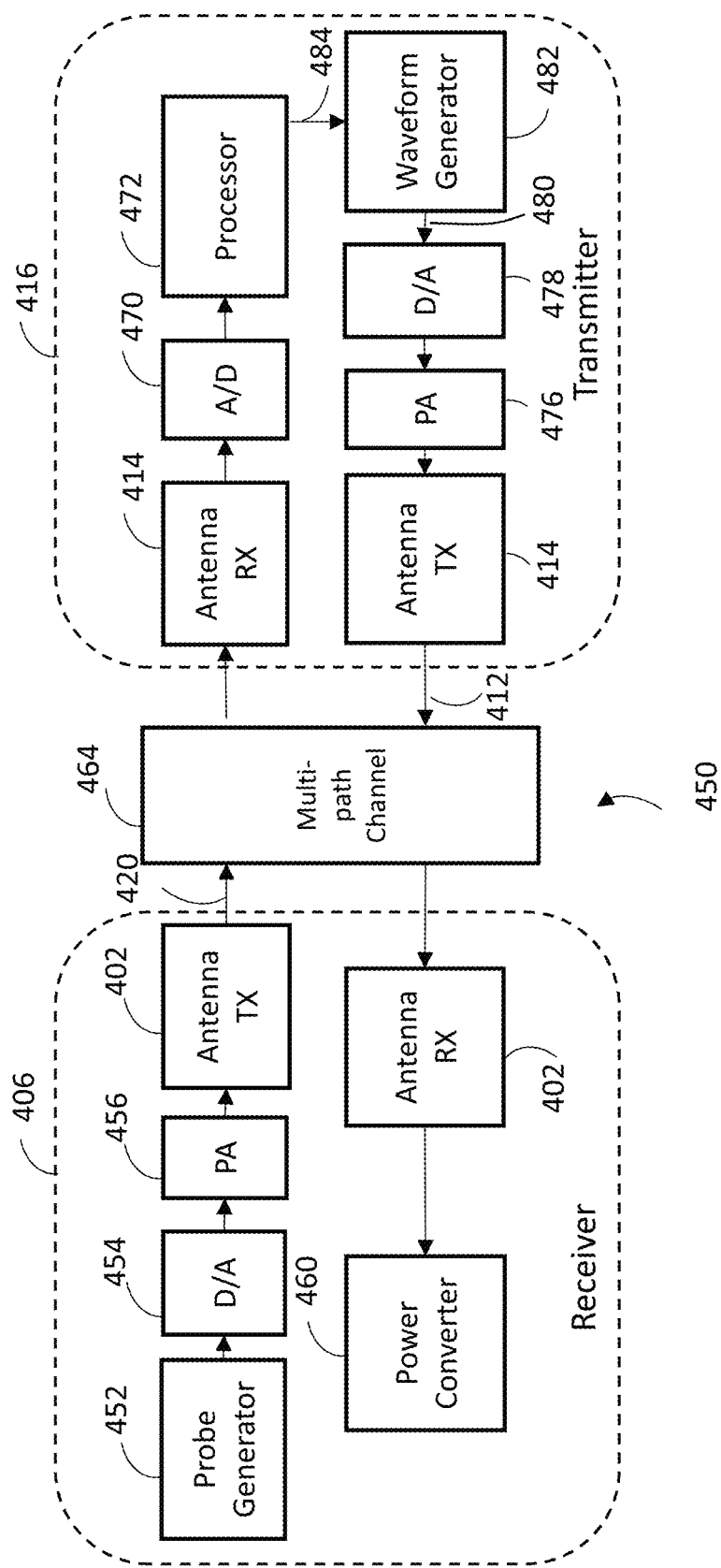
FIG. 4B shows a block diagram of an exemplary power transmitter and power receiver that may be used in the disclosed wireless power transfer system, according to an embodiment of the present teaching.

FIG. 4A shows a block diagram of the experimental set-up and FIG. 4B shows a block diagram of an exemplary power transmitter (Origin) 416 and power receiver (Bot) 406 that may be used in the disclosed wireless power transfer system. In this example, the devices labeled Origin or Bot or transmitter or receiver are all transceivers and can both transmit and receive wireless signals. In exemplary embodiments, an Origin or a transmitter is so-called because it may be the source of the power that is being transmitted wirelessly to the so-called receiver or Bot. In general, it should be understood that the devices exchanging power are wireless transceivers and may be configured as power transmitters and/or power receivers. It should also be understood that power can be exchanged between more than two devices. In some embodiments, one or more power sources may wirelessly transmit power to one or more power receivers. In some embodiments, power may be simultaneously transmitted from one or more power sources to one or more power receivers using power waveforms that utilize CIR information for more than one channel.

A power waveforming system may operate in two phases, a channel probing phase and a power transmission phase. During the channel probing phase, the receiver or Bot 406 may send channel probing signals 410 to the transmitter or Origin 416.

In exemplary embodiments, the Origin 416 may receive the channel probing signals 410 and may determine an estimated channel impulse response or CIR 418 for the wireless channel between the Origin 416 and the Bot 406. In the embodiment illustrated in FIG. 4A, the Origin 416 may send the estimated CIR 418 to a computer 420. The computer 420 may use information from the estimated CIR 418 to generate a power transfer waveform 422. The power transfer waveform 422 may be sent to the Origin 416. The Origin 416 may transmit the power transfer waveform 422 as a transmitted signal 412. The transmitter signal 412 may be received by a receiver or Bot antenna 402 and may be split by a power splitter 404 so that a portion of the received signal is sent to the Bot 406 and a portion of the received signal is sent to the power meter 408.

Figure 5:
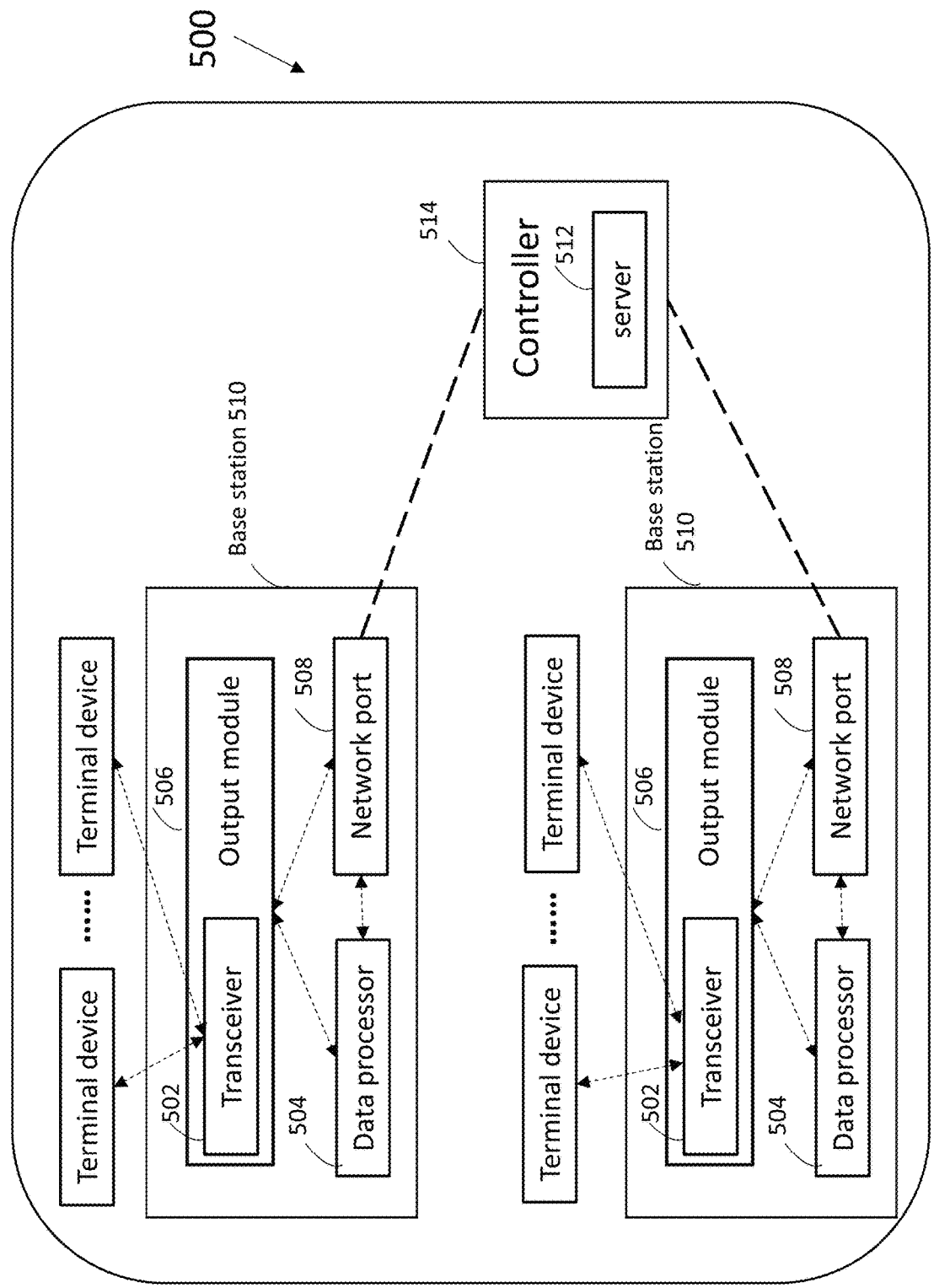
FIG. 5 shows an exemplary block diagram of time-reversal communication system or network, according to an embodiment of the present teaching.

FIG. 5 shows an exemplary block diagram of time-reversal communication system or network, according to an embodiment of the present teaching. Referring to FIG. 5, in some implementations, a time reversal communication system or network 500 uses a centralized protocol for user/network association. The network 500 includes base stations 510 that communicate with a controller 514 that includes a central server computer 512 for determining associations between base stations and terminal devices, e.g., determining which terminal device should be associated with which base stations in order to achieve a certain goal, such as maximizing the sum rate of the system while meeting certain quality metrics for each terminal device.

In this example, each base station 510 includes a network port 508 for connecting to the controller 514, a transceiver 506 for wirelessly communicating with terminal devices, and at least one data processor 504. The transceiver 506 receives at least one channel probing signal from the terminal devices that intend to communicate with the base station 510. The at least one data processor 504 is configured to, for each of the terminal devices that intend to communicate with the base station 510, determine a metric based on the received at least one channel probing signal from the terminal device. The base station 510 sends the metric and current load information to the server 512, and for each of the terminal devices that intend to communicate with the base station 510, the server 512 calculates an association indicator indicating whether the terminal device can be associated with the base station 510 based on at least one of the metric or the load information. The server 512 sends the association indicators to the base station 510. The base station 510 determines which terminal device can be associated with the base station 510 and sends a confirmation to the terminal device indicating that the terminal device can connect to the base station 510.

For each of the terminal devices that can be associated with the base station 510, the base station 510 determines a signature waveform based on a time-reversed waveform of a channel response signal derived from the corresponding received at least one channel probing signal from the terminal device, and determines a respective downlink transmit signal for the respective terminal device based on respective downlink data and the respective signature waveform. The transceiver 506 includes an output module 502 to transmit respective downlink signal to the respective terminal device.

Figure 6:
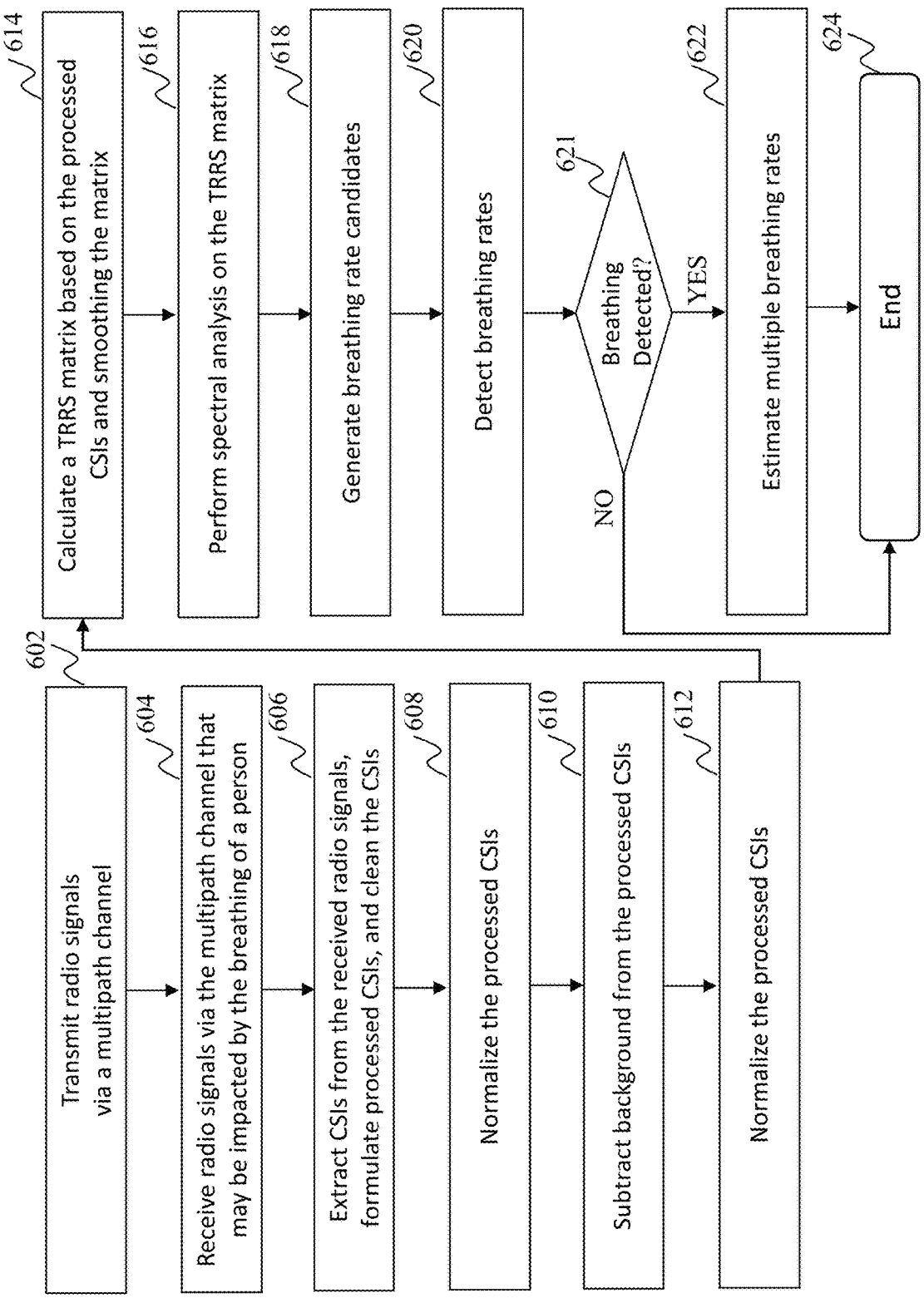
FIG. 6 shows a flow chart for an exemplary process of the breathing monitoring system, according to an embodiment of the present teaching.

FIG. 6 shows a flow chart for an exemplary process of the breathing monitoring system, according to an embodiment of the present teaching. FIG. 6 shows a flow chart showing a general process of breathing monitoring. At 602, a transceiver/transmitter/Bot can transmit radio signals (e.g., a pulse or a pseudo random sequence) via a multipath channel. Then at 604, a receiver/another transceiver/Origin can receive the signals from the multipath channel that are impacted by the breathing of a person. The CSIs are extracted at 606 from the received radio signals using channel estimation. To improve the breathing monitoring, the system can also process the CSIs to obtain processed CSIs, e.g., formulate CSI fingerprints using the CSI fingerprint formulating methods disclosed in patent applications PCT/US2017/015909 and PCT/US2016/066015, which are incorporated herein by reference in their entireties. The phase distortion of the CSIs can be cleaned using phase offset compensation methods disclosed in patent applications PCT/US2017/015909 and PCT/US2016/066015.

Interference/background in the CSIs can be removed at 610 by background subtraction, and the CSIs can be normalized to a unit power before and after the background subtraction, at 608 and 612 respectively. Then a TRRS (time-reversal resonating strength) matrix is calculated at 614 based on the processed CSIs. The TRRS matrix can also be smoothed (e.g., averaged over time) to improve the rank condition of the matrix. After performing spectral analysis at 616 on the TRRS matrix, a set of breathing rate candidates are generated at 618, based on which the existence of breathing human can be detected at 620. For example, by comparing a peak in the spectrum of MUSIC-based spectral analysis with a threshold, or by comparing a distribution of roots after the Root-MUSIC-based spectral analysis with a threshold, the existence of breathing can be detected at 620. If breathing is detected at 621, the breathing rates can be estimated at 622. Otherwise, the process ends at 624.

Figure 7:
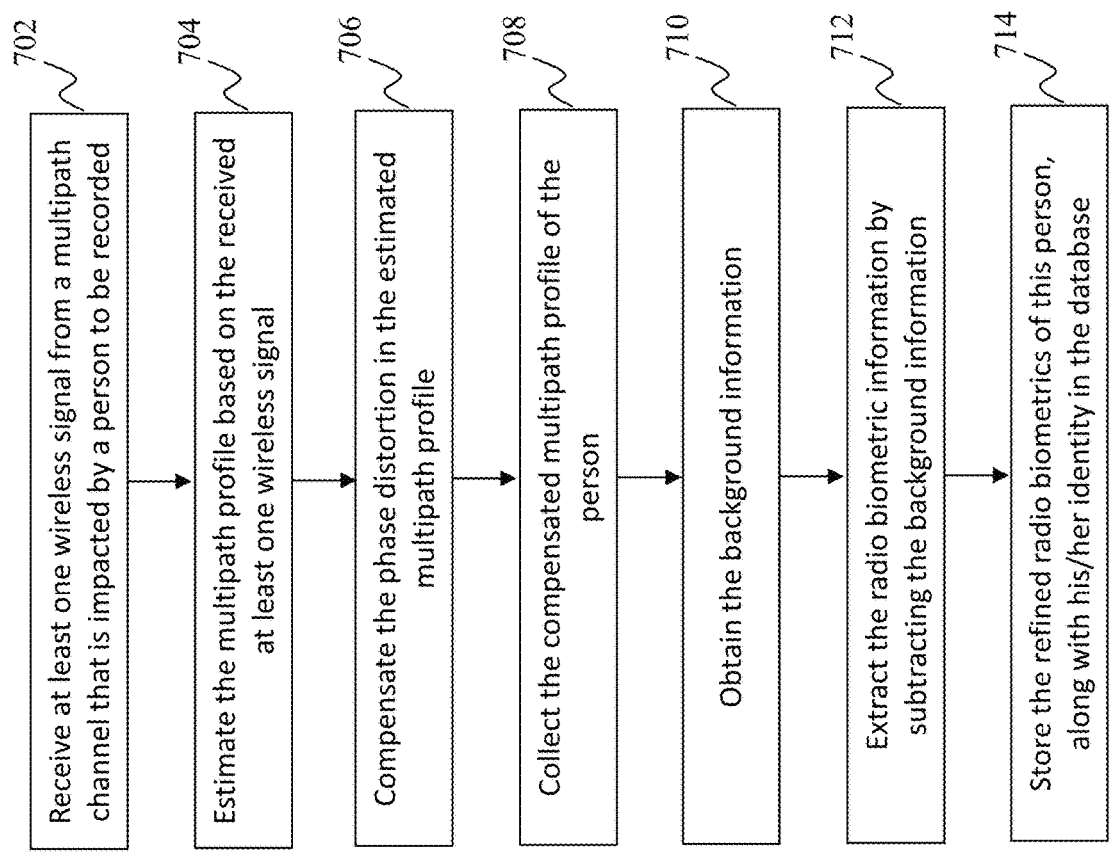
FIG. 7 is a flow chart showing a process of building database for human identification, according to an embodiment of the present teaching.

FIG. 7 is a flow chart showing a process of building database for human identification, according to an embodiment of the present teaching At 702, at least one wireless signal is received from a multipath channel that is impacted by a person to be recorded. The multipath profile is estimated at 704 based on the received at least one wireless signal. The phase distortion in the estimated multipath profile is compensated at 706. The compensated multipath profile of the person is then collected at 708. Background information is obtained at 710. The radio biometric information is extracted at 712, e.g. by subtracting the background information. At 714, the refined radio biometrics of this person, along with his/her identity, may be stored in a database for future use of human identification.

Figure 8:
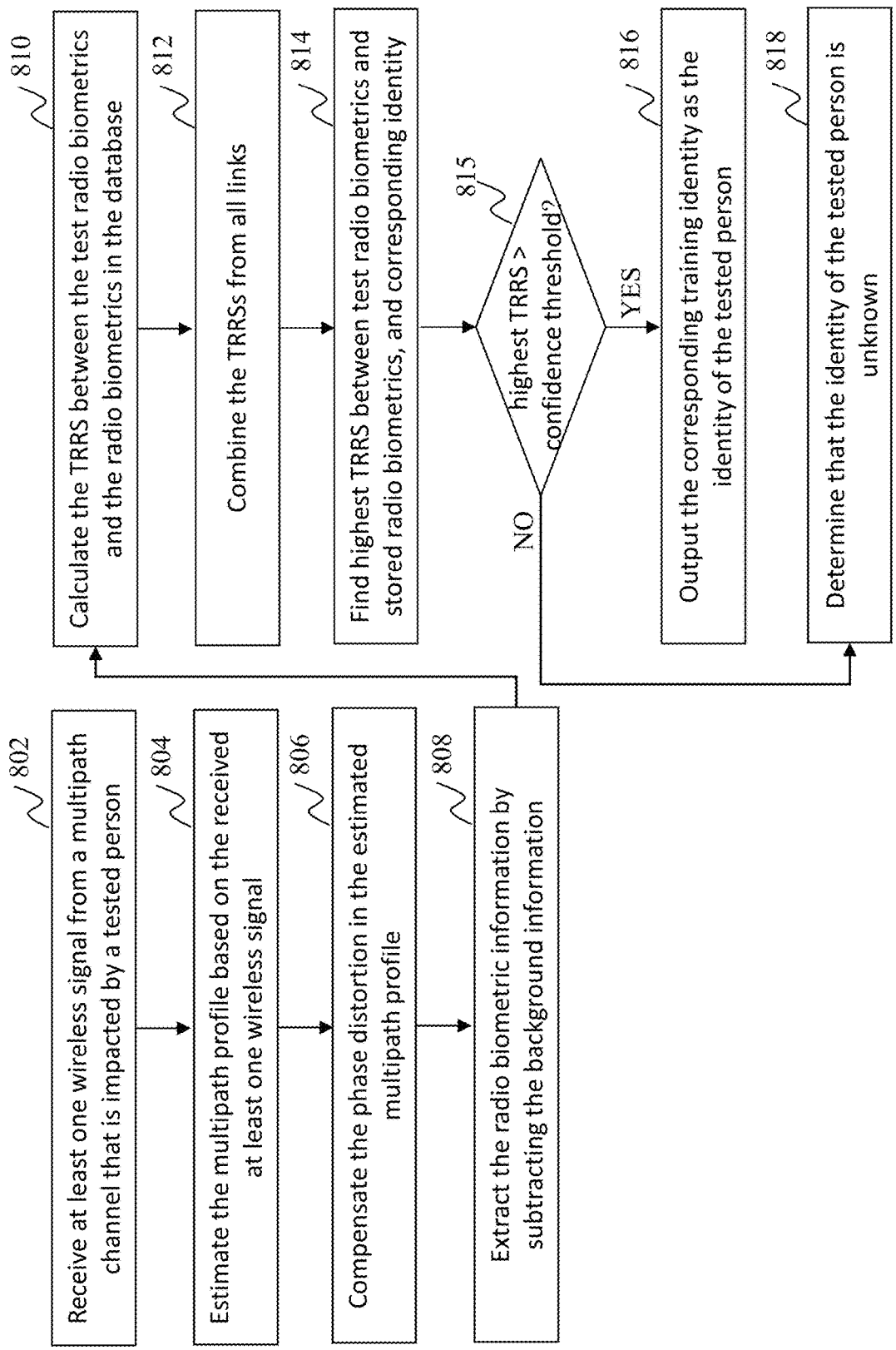
FIG. 8 is a flow chart showing a process of human identification, according to an embodiment of the present teaching.

FIG. 8 is a flow chart showing a process of human identification, according to an embodiment of the present teaching. At 802, at least one wireless signal is received from a multipath channel that is impacted by a person to be tested. The multipath profile is estimated at 804 based on the received at least one wireless signal. The phase distortion in the estimated multipath profile is compensated at 806. The radio biometric information is extracted at 808, e.g. by subtracting the background information. The TRRS between the test radio biometrics and the radio biometrics in the database is calculated at 810. TRRSs from all links are combined at 812. The highest TRRS among all TRRSs between the test radio biometrics and all stored radio biometrics is found at 814, together with a corresponding identity. At 815, it is determined whether the highest TRRS is larger than a predetermined confidence threshold. If so, the process goes to 816, where the corresponding identity is output as the identity of the tested person. Otherwise, the process goes to 818, where it is determined that the identity of the tested person is unknown.

Figure 9:
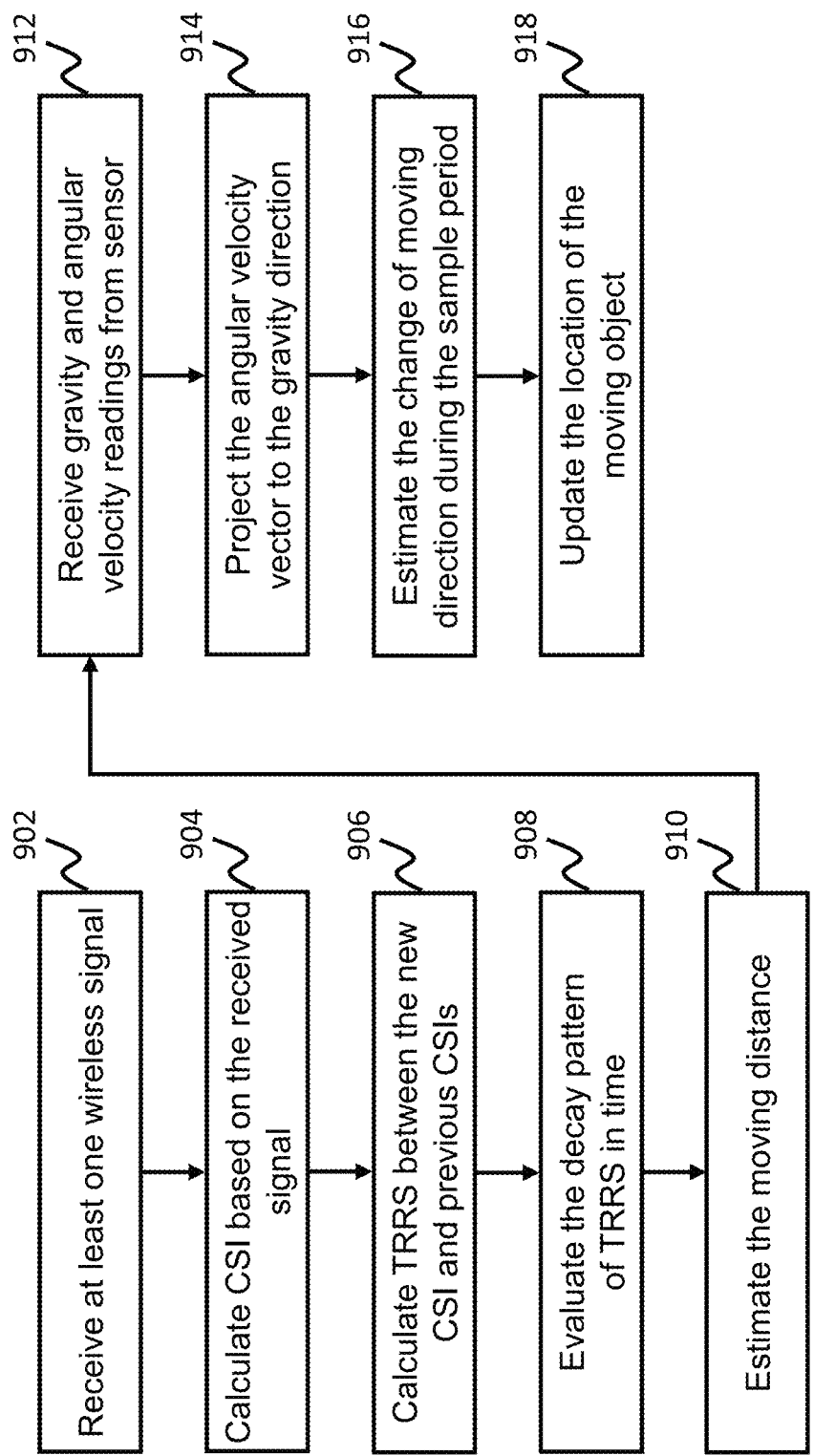
FIG. 9 is a flow chart showing an exemplary process of object tracking, where the estimation of moving direction is based on an inertia measurement unit, according to an embodiment of the present teaching.

FIG. 9 is a flow chart showing an exemplary process of object tracking, where the estimation of moving direction is based on an inertia measurement unit (IMU), according to an embodiment of the present teaching. In one embodiment, a flow chart showing a process of the disclosed object tracking is shown in FIG. 9. A transmitter carried by the moving object transmits at least one wireless signal to a receiver 902. At least one CSI can be estimated based on the received signal, and the phase offsets in the CSIs can be cleaned 904. The TRRS values between the most recent CSI and previously collected CSIs in a time window can be calculated 906, which demonstrate some decay pattern of the TRRS in time 908. TRRS values in multiple such time windows can be averaged to get a smoothed decay pattern. Based on the converging property of the TR resonating effect or the ripple property, the moving distance of the object can be estimated 910. From the direction sensor (e.g. IMU) attached to the moving object, the angular velocity and gravity information can be read 912. The angular velocity can be projected 914 to the gravity direction, and the change of the moving direction can be estimated 916. Finally, the location of the moving object is updated 918 based on the estimated moving distance and direction.

Figure 10:
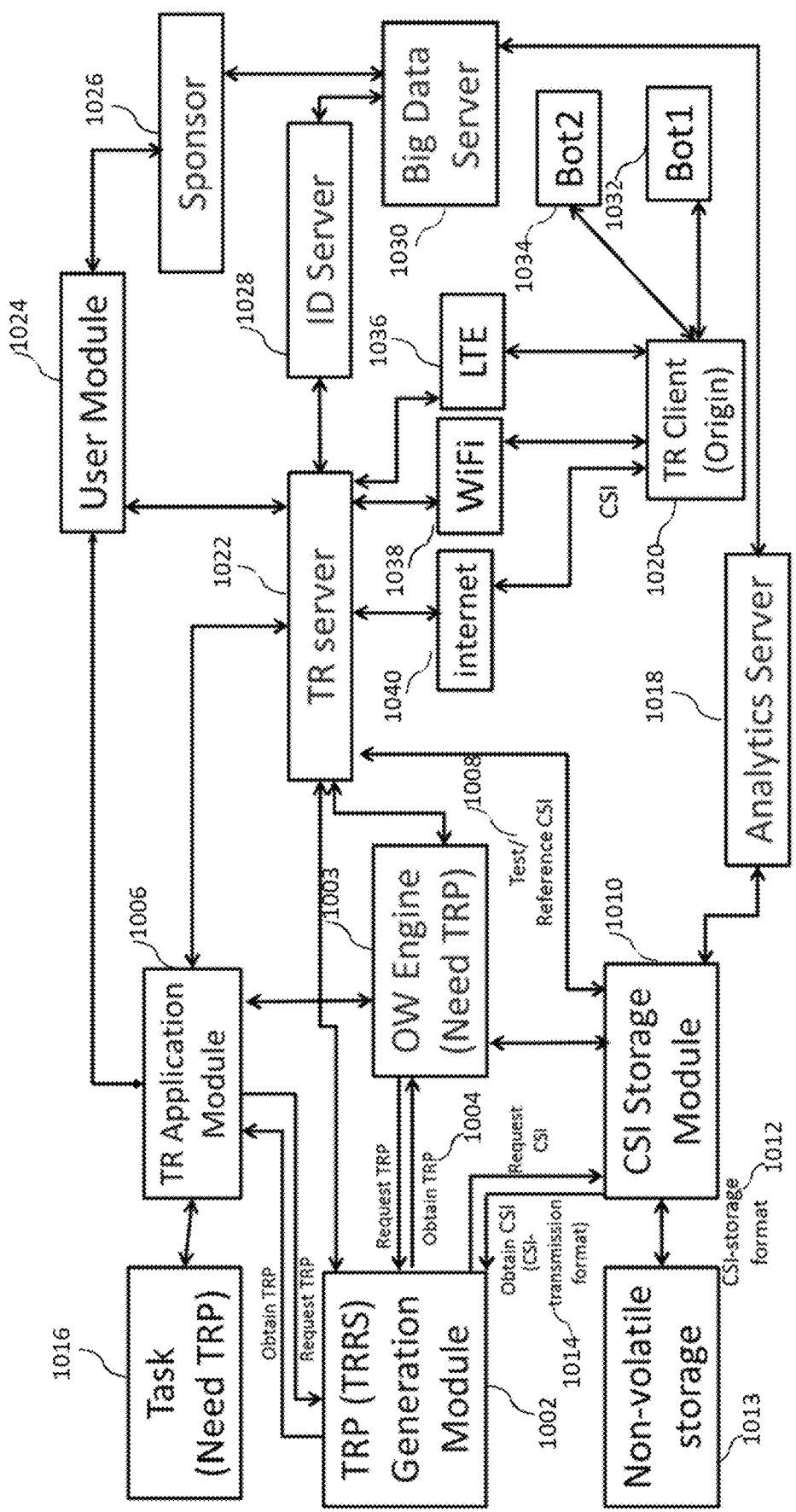
FIG. 10 illustrates exemplary relationships among various modules or components disclosed in the present teaching, according to an embodiment of the present teaching.

FIG. 10 illustrates exemplary relationships among various modules or components disclosed in the present teaching, according to an embodiment of the present teaching. Blocks with the same name in FIG. 10 and in other figures and other places in the present teaching may refer to a same block or component.

As shown in FIG. 10, the OW engine 1003 may call the TRP generation module 1002 to compute time reversal parameter (TRP), e.g. TRRS, and perform various algorithms/methods for various applications, such as security/guard engine, breathing/health/emotion/well being/vital signs monitoring engine, positioning/tracking engine, data communication engine, action/event detection engine, wireless charging/power transfer engine, wireless biometric engine, authentication engine, etc. The OW engine 1003 may be a software, an app and/or a driver. The OW engine 1003 may be a hardware (e.g. containing a chip, an ASIC, an FPGA, a DSP, a microcontroller, a CPU, and/or a GPU, etc.) with matching software/app/driver. The OW engine 1003 may be the TR server 1022. The OW engine 1003 may also be the TR application module 1006. The OW engine 1003 may also be the TR client 1020. The OW engine 1003 may be updated by connecting to the TR server 1022 and downloading updated driver/software from the TR server 1022.

To compute TRP, the TRP generation module 1002 may need one or more CSI which may be reference CSI stored in the CSI storage module 1010 and/or test CSI freshly captured by the TR client 1020, which may serve as an origin working in conjunction with at least one bot (e.g. Bot1 1032 and/or Bot2 1034) here. (In other cases, the TR Client 1020 may be a bot and at least one of Bot1 1032 and Bot2 1034 may be an origin.) The TRP generation module 1002 may request and fetch CSI directly from CSI storage module 1010 and/or TR Client 1020, or obtain the CSI through the OW Engine 1003. The TRP generation module 1002 may be a software, an app and/or a driver. It may also be a hardware (e.g. containing a chip, an ASIC, an FPGA, a DSP, a microcontroller, a CPU, and/or a GPU, etc) with matching software/app/driver. The TRP generation module 1002 may be part of the OW engine 1003.

The TR application module 1006 in this example can call the OW Engine 1003 (either directly or via the TR server 1022) to perform part or all of a task 1016. The TR application module 1006 may be a driver, an app and/or a software. The TR application module 1006 may be a hardware (e.g. containing a chip, an ASIC, an FPGA, a DSP, a microcontroller, a CPU, and/or a GPU, etc), with matching software/app/driver to interact with the user module 1024, the TR server 1022, the OW Engine 1003 and the TRP generation module 1002. The TR application module 1006 may be the user module 1024. The TR application module 1006 may provide the user interface. The TR application module 1006 may be the TR server 1022. The TR application module 1006 may be the TR client 1020. The TR application module 1006 may also be a server interacting with the user module 1024, and the TR server 1022.

The user module 1024 may be a software, an app, a smart phone, a computer, a computing device, a wired device, a wireless device, and/or a smart device that may have a driver, an APP and/or a software (e.g. TR application module 1006) installed. It may also be a hardware that can run software or call a web service related to the TR application module 1006. Associated with the user module 1024, there may be one or more user, with associated user information and/or user profile (e.g. name, address, phone number, email address, phone book, contact list, family info, household information (info), work info, school info, preference, history, habit, etc) which may be part of the ID info associated with the user module 1024. Associated with the user module 1024, there may be associated information related to its network, its IP address, its MAC address, its physical address, its hardware address, other device address/name (in the same network, or in the vicinity), SIM ID, series number, phone number, etc, which may also be part of the ID info associated with the user module 1024. The user module 1024 may send the ID info to the TR server 1022. Either the user module 1024 and/or TR application module 1006 may be sandboxed.

The ID server 1028 may be configured for associating (1) the CSI data and/or associated analytics from the analytics server 1018, (2) auxiliary information, (3) a user of the user module 1024 with associated user information and/or user profile, (4) the TR client 1020, (5) the Bot1 1032 and/or the Bot2 1034, (5) the space between the TR client 1020 and Bot1 1032 (or Bot2 1034), and/or (6) another user associated with the space. The ID server 1028 may maintain/record/store the association (e.g. using an association table, some data structure and/or some database). The input to the ID server 1028 may include CSI, time stamp, identification (ID) information (info) of TR client 1020, ID info of Bot1 1032, ID info of Bot2 1034, ID info of the user of the user module 1024, ID info of the space, event history, IP address, physical address, MAC address, hardware address, other device address/name, SIM ID, series number, information associated with the network (including the internet 1040, the WiFi 1038 and LTE 1036) associated with the TR client 1020, information associated with another network associated with the user module 1024 and/or the application module 1006, information associated with the sponsor 1026, auxiliary information, etc. The ID server 1028 may be in the cloud or in some data center. It may be located close to the TR server 1022. The ID server 1028 may be a software, an app and/or a driver. It may be a hardware (e.g. containing a chip, an ASIC, an FPGA, a DSP, a microcontroller, a CPU, and/or a GPU, etc.) with matching software/app/driver. The ID server 1028 may be the TR server 1022. The ID server 1028 may be the TR client 1020.

The TR client 1020 may be a wireless device with connection to the TR server 1022 (e.g. through internet 1040, WiFi 1038 and/or LTE 1036). The WiFi 1038 may include bluetooth, other Bluetooth-like system, WiFi, other WiFi-like system, and other wireless system. The LTE 1036 may include all cellular networks such as 2G, 2.5G, 3G, 3.5G, 3.75G, 4G, 5G, WiMax, etc. and other cellular systems. There can be other type of devices associated with the TR client 1020, such as gyroscope, sensor, camera, microphone, etc, which may be communicatively coupled with the TR client 1020.

The TR client 1020 is associated with one or more bot (e.g. Bot1 1032 and/or Bot2 1034), which together are associated with a space. The space may be a house, an office, a warehouse, a man-made structure, a natural landscape, a garage, an indoor environment, a concert hall, an airport terminal, a shopping mall, a building, a sports facility, an enclosed space, a cave, a duct, a vent, a piping system, a cavity, a valley, a parking lot, a wood, a forest, a rock/land formation, an outdoor environment/area with barriers such as trees, walls, structures to generate multipaths. Associated with the space, there may be one or more users, with associated user information and/or user profile (e.g. name, address, phone number, email address, phone book, contact list, family info, household info, work info, school info, preference, history, habit, etc). Associated with TR client 1020, there may be associated information related to its network (e.g. the internet 1040, WiFi 1038 and LTE 1036), its IP address, its MAC address, its physical address, its hardware address, other device address/name (in the same network, or in the vicinity), SIM ID, series number, phone number, etc. The TR client 1020 may be sandboxed. The TR client 1020 may send an identification information to the TR server 1022. Between the TR client 1020 and Bot1 1032 and Bot2 1034, the role of being time reversal origin and bot may be inter-changed and/or coexist. The TR client 1020 may be origin with Bot1 1032 and Bot2 1034 as bot. The TR client 1020 may also function as bot while at least one of Bot1 1032 and Bot2 1034 function as origin, perhaps even simultaneously (i.e. the TR client 1020 functions both as origin and as bot simultaneously).

The analytics server 1018 may deal with (e.g. define, update definition, compute, analyze, mine, fuse, manage, communicate, store) analytics related to the entire and/or part of the history of time-reversal parameters, e.g. time reversal resonating strength, and any analytics that can be derived from the CSIs such as similarity score, distance measure of two CSIs using statistical approach, machine learning, or deep learning, and that can be used for analyzing user behavior. The analytics may be related to/based on the task 1016, the TR application module 1006, the user module 1024, a user associated with the user module 1024, the TR client 1020, the Bot1 1032, the Bot2 1034, the associated wireless multipath channel, the associated space, the associated networks (including internet 1040, WiFi 1038, LTE 1036), auxiliary information, another associated user (e.g. a user associated with the space, or the TR client 1020, Bot1 1032, Bot2 1034) and/or the sponsor 1026. Some analytics may combine TRP with auxiliary information (e.g. time stamp, location parameters, motion parameters, directional parameters, positional parameters, geographical information, weather information, sensors, user information, household information, neighborhood information, network information, device information, etc.) and analyze/predict the individual/combined behavior, trends, co-occurrence, and correlation. While there may be many TR clients (and users associated with the TR clients), the analytics server 1018 may analyze them individually and/or jointly. The analytics server 1018 may be in the cloud or in some data center. It may be located close to the CSI storage module 1010, the non-volative storage 1013, and/or the TR server 1022. The analytics server 1018 may be a software, an app and/or a driver. It may be a hardware (e.g. containing a chip, an ASIC, an FPGA, a DSP, a microcontroller, a CPU, and/or a GPU, etc.) with matching software/app/driver. The analytics server 1018 may be the CSI storage module 1010. The analytics server 1018 may be the TR server 1022. The analytics server 1018 may be the TR client 1020.

The big data server 1030 may interact with the sponsor 1026, receiving enquiries from the sponsor 1026 and providing answers based on the analytics computed by the analytics server 1018. The enquiries may be related to the user module 1024 and one (or more) first user associated with the user module 1024. The enquiries may also be related to the space associated with the TR client 1020, Bot1 1032 and Bot2 1034. The enquiries may also be related to one or more second users associated with the space. The one or more first user associated with the user module 1024 may be associated with the one or more second user associated with the space through the ID server 1028.

The sponsor 1026 may be a potential buyer of data from the big data server 1030, the analytics server 1018, and/or the CSI storage module 1010. For example, the first user associated with the user module 1024 may be browsing a webpage (e.g. a Google search page, or a page hosted by Google server, or any page that support advertisement) with an advertisement (ad) spot. The sponsor 1026 may be a company and/or an ad server seeking to post an ad on the ad spot of the webpage. The sponsor may want to know if the background of the first user matches its intended audience. The sponsor 1026 may send the enquiry to the big data server 1030 by passing an ID info of the first user to the big data server 1030. The ID server 1028 may associate the first user to a second user associated with the TR client 1020, based on the ID info of the first user and some ID info of the second user. The big data server 1030 may then proceed to analyze the behavior of the second user based on the analytics computed by the analytics server 1018 and any further analytics computed using CSI stored in the CSI storage module 1010. The big data server 1030 sends the answers to the enquiries to the sponsor 1026. There may be a charge associated with the enquiry and the answer.

As another example, the first user of the user module 1024 may be a customer of the sponsor 1026. (For example, the first user may be using some indoor map navigation system in a shopping mall. The user module 1024 may be his mobile phone running a TR application module 1006 which is a map app. The Bot1 1032 may be installed in his mobile phone. The TR client 1020 is a device installed in the shopping mall.) The first user may want to know some information from the sponsor 1026 about the space associated with the TR client 1020 (e.g. the current location of the first user in a shopping mall). The sponsor 1026 may send the enquiry to the big data server 1030 (and command Bot1 1032 to start sending channel probing signals) together with some ID info of the TR client 1020 (e.g. the ID info of Bot1 1032 installed in first user's mobile phone). The big data server 1030 may break down the enquiry into commands to the TR server 1022 and the analytics server 1018 such that the TR client 1020 would capture some instantaneous CSI, pass to the TR server 1022 via internet 1040, WiFi 1038 and/or LTE 1036, and onto the OW engine 1003 (e.g. a location/tracking engine). The OW engine may send the instantaneous CSI to the TRP generation module 1002 which then computes some TRP based on the instantaneous CSI and some CSI stored in the CSI storage module 1010. In some situations, the OW engine 1003 may perform some computation (e.g. the location/tracking engine may determine location of Bot1 1032 based on the TRP computed by the TRP generation module 1002, and/or some auxiliary information from some sensor) and produce a result (e.g. location of Bot1 1032 represented in some mapping coordinate) to the TR server 1022 and onward to the big data server 1030. The big data server 1030 would then send the result to the sponsor 1026, at a fee. The sponsor 1026 may process the result and pass to the first user's user module 1024 (e.g. the user module 1024 may draw the location of the first user on a map app and send another request to the sponsor for the new location of Bot1 1032. And the process repeats itself until the first user arrives at the destination and stop the app.)

In some other situations, the analytics server 1018 may need to perform some analysis, based on past CSI stored in the CSI storage module, some past analytics, and/or the instantaneous CSI. The analytics server 1018 would pass the result to the big data server 1030. The big data server 1030 may process the result and send to the sponsor 1026. Or, the big data server 1030 may combine the results from the OW engine 1003 and the analytics server 1018, process the combined results and send to the sponsor 1026. In the example, the analytic server 1018 may analyze the location of the first user and find that the first user always stops at a computer game store in the shopping mall. The analytic server 1018 may also observe that the first user goes to the men's rest room. Combining with other observations, the analytics server 1018 may know that the first user goes to a particular high school during weekdays. Thus, the analytics server 1018 may conclude that the first user may be a teenage male who loves to play computer games. This information may be useful to the sponsor 1026 who would be willing to pay for this and related data. The computer game store may be particularly interested in identifying the first user and other similar game lovers and may be willing to pay a significantly higher ad fee to play targeted advertisement of the latest game to the such game lovers.

In yet other situations, the TR application module 1006 may send a request to the TR server 1022 directly without going through the sponsor 1026 and the big data server 1030. The TR client 1020 may capture the instantaneous CSI, and pass to TR server via internet 1040, WiFi 1038 and/or LTE 1036, and onto OW engine 1003. The OW engine 1003 may request the TRP generation module 1002 to compute some TRP based on the instantaneous CSI and/or some stored CSI in the CSI storage module 1010. Based on the TRP, the OW engine 1003 may perform some computation to obtain the instantaneous location of Bot1 1032 and may send the result to the TR application module 1006 through the TR server 1022.

Another example is baby breathing monitoring. A mother may buy a pair of TR client 1020 and Bot1 1032 and place them outside a baby room to monitor the breathing of her baby. The mother may use an app (a TR application module 1006) on her mobile phone (user module 1024) to pair up with the TR client 1020 via the TR server 1022. She may use the app (TR application module 1006) to activate the baby monitor (TR client 1020 and Bot1 1032). Once started, TR client 1020 may capture a series of instantaneous CSI and pass to TR server via internet 1040, WiFi 1038 and/or LTE 1036, and onto the OW engine 1003 (a breathing engine). The OW engine 1003 may command the TRP generation module 1002 to compute a series of TRP from the series of instantaneous CSI. The OW engine 1003 may analyze the series of TRP to compute the instantaneous breathing rate of the baby. The OW engine 1003 may send the instantaneous breathing rate to the app (TR application module 1006) of the mother's mobile phone (user module 1024). The app (TR application module 1006) may draw the instantaneous breathing rate in a moving diagram containing the baby's breathing pattern in the past 5 minutes in a GUI for easy visualization for the mother. With the press of a button in the app, the mother may view the baby's breathing pattern in the last 24 hours. From the plot, she may detect that the baby's breathing is unusual and may suspect that the baby may be developing a stuffy nose condition and may need to see a doctor. The baby monitor may be used to monitor the breathing of a senior citizen in a retirement community without intruding into the living space of the senior citizen. It can also be used to monitor a patient in a ward in a hospital.

The relationships shown in FIG. 10 among different blocks are for illustration, not for limitation of their relationships.

Figure 11:
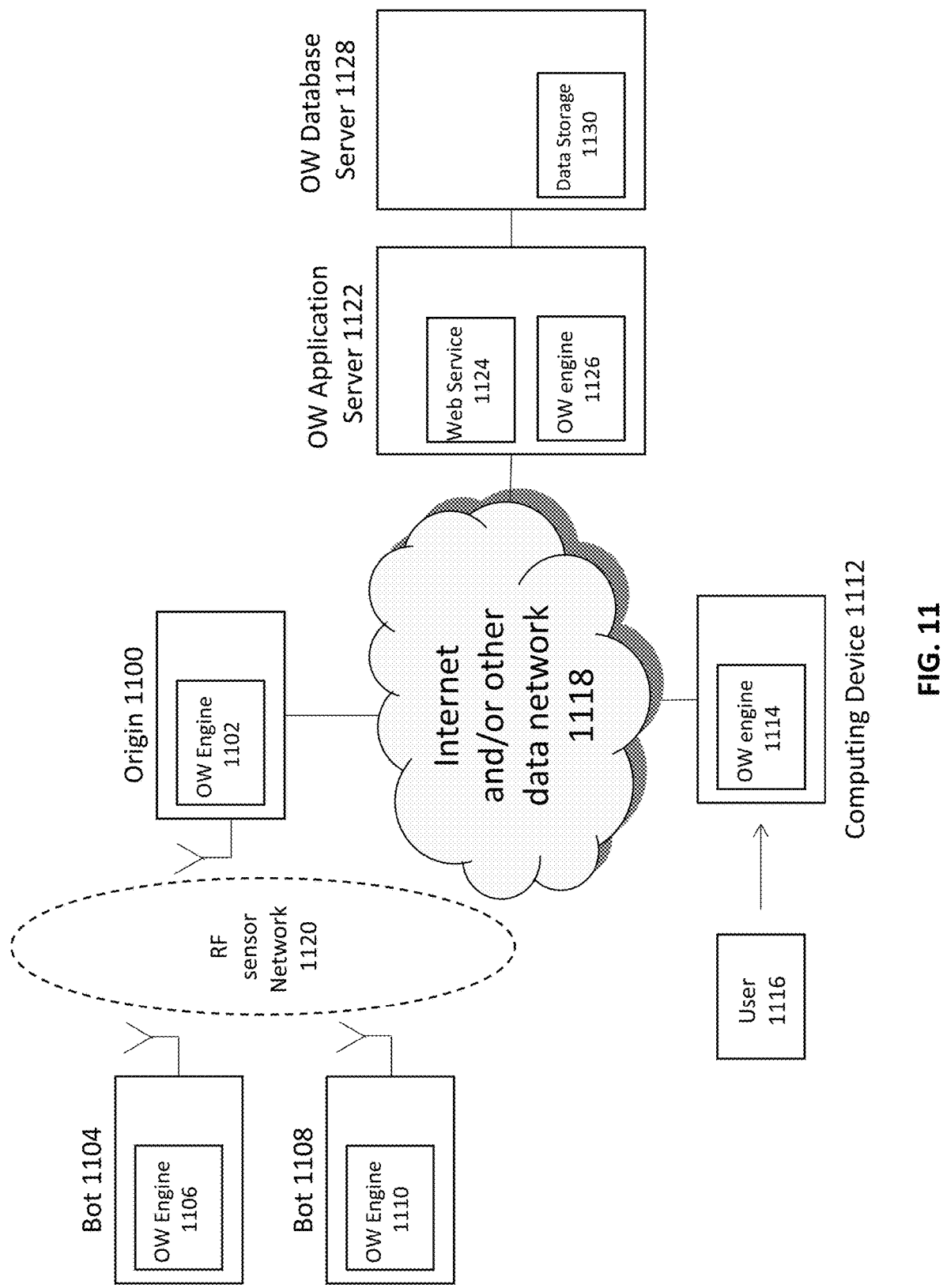
FIG. 11 illustrates another exemplary relationship among various modules or components disclosed in the present teaching, according to an embodiment of the present teaching.

FIG. 11 illustrates another exemplary relationship among various modules or components disclosed in the present teaching, according to an embodiment of the present teaching. The time reversal parameter generation module may be in a local device (e.g. a Bot, Origin, smartphone, and/or other local device as shown in example in FIG. 11.

FIG. 11 illustrates another exemplary system showing relationships among various modules or components disclosed in the present teaching, according to an embodiment of the present teaching. Blocks with the same name in FIG. 11 and in other figures and other places in the present teaching may refer to a same block or component.

Figure 12:
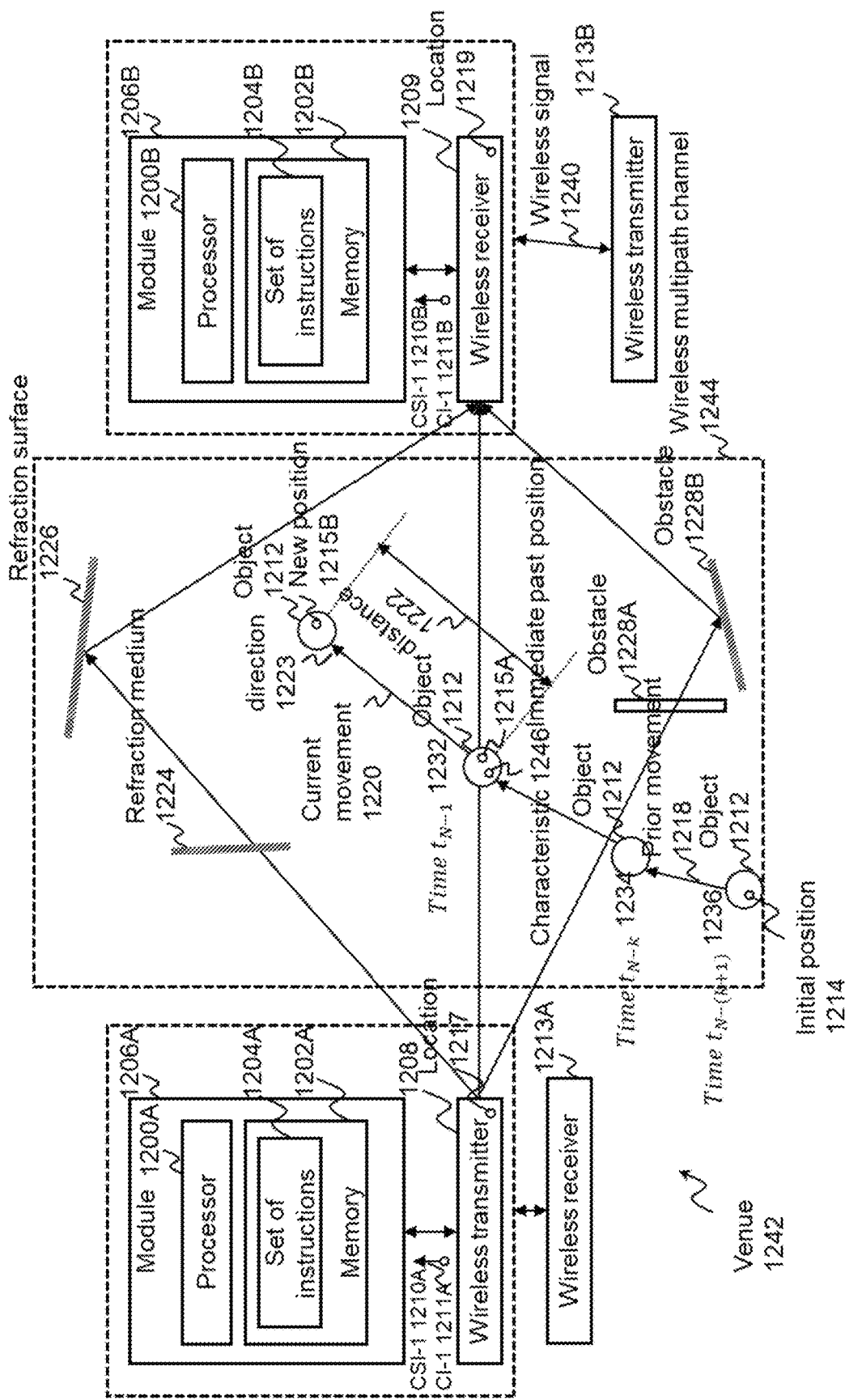
FIG. 12 is a diagram showing an exemplary environment for determining a first position of an object using wireless signal, according to an embodiment of the present teaching.

FIG. 12 is a diagram showing an exemplary environment for determining a first position of an object using wireless signal (e.g. 1240), according to an embodiment of the present teaching. In one embodiment, a method/device/system of an object tracking system including obtaining one or more time series of channel information (CI, e.g. 1211A, 1211B of FIG. 12) of a wireless multipath channel (e.g. 1244 of FIG. 12) using a processor (e.g. 1200A, 1200B of FIG. 12), a memory (e.g. 1202A, 1202B of FIG. 12) communicatively coupled with the processor (e.g. 1200A, 1200B) and a set of instructions (e.g. 1204A, 1204B of FIG. 12) stored in the memory (e.g. 1202A, 1202B). The one or more time series of channel information (1211A, 1211B) is extracted/derived/obtained from a wireless signal (e.g. 1240 of FIG. 12) transmitted between a Type 1 heterogeneous wireless device (e.g. 1206A, 1206B, 1208, 1209, 1213A, 1213B of FIG. 12) at a first position (e.g. 1214, 1215B, 1215A, 1217, 1219) in a venue (e.g. 1242 of FIG. 12) and a Type 2 heterogeneous wireless device (e.g. 1206A, 1206B, 1208, 1209, 1213A, 1213B of FIG. 12) at a second position (e.g. 1214, 1215B, 1215A, 1217, 1219) in the venue (e.g. 1242) through the wireless multipath channel (e.g. 1244). The wireless multipath channel (e.g. 1244) is impacted by a current movement (e.g. 1220) of an object (e.g. 1212) in the venue (e.g. 1242). The method/device/system also determines a spatial-temporal information (e.g. location, speed, velocity, acceleration, a periodic motion, a time trend, a transient motion, a period, etc.) of the object (e.g. 1212) based on the at least one time series of channel information (1211A, 1211B), a time parameter associated with the current movement (e.g. 1220), and/or a past spatial-temporal information of the object (e.g. 1212). The one or more time series of channel information (1211A, 1211B) is preprocessed. The spatial-temporal information includes a location, a horizontal location, a vertical location, a speed, a displacement, an acceleration, a rotational speed, a rotational acceleration, a gait cycle, a periodic motion, a period of the periodic motion, a frequency of the periodic motion, a transient motion, a time trend, an event and/or another information. Computation associated with the method/device/system is shared among the processor (e.g. 1200A, 1200B), the Type 1 heterogeneous wireless device (e.g. 1206A, 1206B, 1208, 1209, 1213A, 1213B) and the Type 2 heterogeneous wireless device (e.g. 1206A, 1206B, 1208, 1209, 1213A, 1213B).

The Type 1 heterogeneous wireless device (e.g. 1206A, 1206B, 1208, 1209, 1213A, 1213B) and the Type 2 heterogeneous wireless device (e.g. 1206A, 1206B, 1208, 1209, 1213A, 1213B) may be different. Different Type 1 heterogeneous wireless devices (e.g. 1206A, 1206B, 1208, 1209, 1213A, 1213B) may be different. Different Type 2 heterogeneous devices (e.g. 1206A, 1206B, 1208, 1209, 1213A, 1213B) may be different. They may have different amount of antennas (e.g. 200A, 200B, 200C, 200D, 200E, 200F). Their antennas (e.g. 200A, 200B, 200C, 200D, 200E, 200F) may be different. They may use different circuit boards, different chips, and/or different logic with different power consumption and/or different prices. Each may have different additional functionalities and/or upgraded functionalities. They may be from different manufacturers, different factories, and/or from different brands. They may share some common components (e.g. hardware, antenna, circuit, processor (e.g. 1200A, 1200B), memory (e.g. 1202A, 1202B), storage, network), some common software (e.g. in the device (e.g. 1206A, 1206B, 1208, 1209, 1213A, 1213B), in the cloud, etc.), and/or some common modules.

A distance (e.g. 1222) of the current movement (e.g. 1220) of the object (e.g. 1212) may be determined (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device) based on the one or more time series of the channel information (1211A, 1211B). An estimated direction (e.g. 1223) of the current movement (e.g. 1220) of the object (e.g. 1212) may be obtained. The spatial-temporal information of the object (e.g. 1212) may be determined based on the distance (e.g. 1222) and/or the estimated direction (e.g. 1223) of the current movement (e.g. 1220) of the object (e.g. 1212).

At least one similarity score may be computed (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device). Each similarity score may be based on a pair of temporally adjacent CI (e.g. 1211A, 1211B) of the time series of CI associated with the current movement (e.g. 1220) of the object (e.g. 1212). A characteristic similarity score (e.g. representative similarity score such as a mean, a medium, a mode, a weight average, a centroid, a percentile, a quartile, a trimmed mean, etc.) may be computed based on the at least one similarity score. A distance (e.g. 1222) of the current movement (e.g. 1220) of the object (e.g. 1212) may be determined based on comparing the characteristic similar score to a reference decay curve (e.g. a curve generated by a mathematic formulae, a curve learned by some learning algorithm, or a combination of both, etc.). The spatial-temporal information of the object (e.g. 1212) may be determined based on the distance (e.g. 1222) of the current movement (e.g. 1220) of the object (e.g. 1212).

At least one most recent CI (e.g. 1211A, 1211B) may be determined (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device). Each most recent CI (e.g. 1211A, 1211B) may be most recent in one of the one or more time series of CI. "Most recent" may be "current." A most recent CI may be a CI with a most recent time index. One or more time series of similarity scores may be computed. Each similarity score may be computed based on two channel information (e.g. 1211A, 1211B) (CIs) of a particular time series associated with the similarity score. The two CI (e.g. 1211A, 1211B) may be the most recent CI (e.g. 1211A, 1211B) and a temporally adjacent CI (e.g. 1211A, 1211B) within a time window associated with the current movement (e.g. 1220) of the object (e.g. 1212). The set of temporally adjacent CI used to compute the time series of similarity scores may include all recent-past CI within a time window. At least one curve may be determined. Each curve may be determined based on a time series of similar scores. At least one feature point of a curve may be identified. The spatial-temporal information of the object (e.g. 1212) may be determined/computed based on the at least one feature point. The at least one feature point may include: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and/or another feature point.

At least one second similarity score may be computed (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device). Each similarity score may be computed based on an initial CI (e.g. 1211A, 1211B) and a current CI (e.g. 1211A, 1211B). The initial CI (e.g. 1211A, 1211B) may be temporally close to a beginning of the current movement (e.g. 1220). The current CI (e.g. 1211A, 1211B) may be temporally close to an end of the current movement (e.g. 1220), and/or a current moment. A characteristic second similarity score may be determined based on the at least one second similar score. If the characteristic second similarity score is greater than (or "greater than or equal to", or "less than" or "less than or equal to") a threshold, the object (e.g. 1212) may be determined to be stationary and the current movement (e.g. 1220) may be determined to be a null movement, a small movement, and/or a negligibly small movement.

The preprocessing may include: doing nothing, de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and/or another preprocessing.

A similarity score may be computed (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device) based on a pair of temporally adjacent CI (e.g. 1211A, 1211B) of a particular time series of CI. The similarity score may also be based on a pair of temporally adjacent CI (e.g. 1211A, 1211B) from two different time series of CI. The similarity score may be or may include: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score. The spatial-temporal information of the object (e.g. 1212) may be determined/computed based on the similarity score.

The channel information (e.g. 1211A, 1211B) may be associated with: signal strength, signal amplitude, signal phase, attenuation of the wireless signal (e.g. 1240) through the wireless multipath channel (e.g. 1244), received signal strength indicator (RSSI), channel state information (CSI, e.g. 1210A, 1210B of FIG. 12), an equalizer information, a channel impulse response, a frequency domain transfer function, information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics, information associated with at least one of: a time period, a time signature, a time amplitude, a time phase, a time trend, and a time characteristics, information associated with at least one of: a time-frequency partition, a time-frequency signature, a time-frequency amplitude, a time-frequency phase, a time-frequency trend, and a time-frequency characteristics, information associated with a direction (e.g. 1223), an angle of arrival, an angle of a directional antenna, and a phase, and/or another channel information (e.g. 1211A, 1211B), of the wireless signal (e.g. 1240) through the wireless multipath channel (e.g. 1244).

An initial spatial-temporal information (e.g. initial position 1214) of the object (e.g. 1212) at an initial time (e.g. 1216) prior to the current movement (e.g. 1220) of the object (e.g. 1212) may be determined (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device) based on another time series of another channel information (e.g. 1211A, 1211B) (CI) associated with a prior movement of the object (e.g. 1212). The another time series of the another channel information may be extracted from a second wireless signal (e.g. 1240) transmitted between a second Type 1 heterogeneous device (e.g. 1206A, 1206B, 1208, 1209, 1213A, 1213B) at a third position in the venue (e.g. 1242) and a second Type 2 heterogeneous device (e.g. 1206A, 1206B, 1208, 1209, 1213A, 1213B) at a fourth position in the venue (e.g. 1242) through the wireless multipath channel (e.g. 1244). The wireless multipath channel (e.g. 1244) may be impacted by the prior movement of the object (e.g. 1212). The initial spatial-temporal information (e.g. initial position 1214) of the object (e.g. 1212) at the initial time (e.g. 1216) may be determined to be a known location associated with the second Type 1 heterogeneous device (e.g. 1206A, 1206B, 1208, 1209, 1213A, 1213B) and/or the second Type 2 heterogeneous device (e.g. 1206A, 1206B, 1208, 1209, 1213A, 1213B). A time period may be determined. Within the time period, essentially all (e.g. all except a few, or all without the outliers) corresponding CI (e.g. 1211A, 1211B) of the another time series of the another CI (e.g. 1211A, 1211B) may be larger than a first adaptive threshold and smaller than a second adaptive threshold. The initial time (e.g. 1216) may be determined as a characteristic point of the time period. The spatial-temporal information of the object (e.g. 1212) may be determined based on the initial spatial-temporal information (e.g. initial position 1214) of the object (e.g. 1212) at the initial time (e.g. 1216). The characteristic point of the time period may be: a mid-point, a quartile point, a percentile point, a starting point, an ending point, a point at which the another CI (e.g. 1211A, 1211B) is locally maximum, a point at which the another CI (e.g. 1211A, 1211B) is locally minimum, a point at which the another CI (e.g. 1211A, 1211B) has a certain characteristics, and/or another characteristic point.

At the initial time (e.g. 1216) during the prior movement of the object (e.g. 1212), "one" of the second Type 1 heterogeneous device (e.g. 1206A, 1206B, 1208, 1209, 1213A, 1213B) and the second Type 2 heterogeneous device (e.g. 1206A, 1206B, 1208, 1209, 1213A, 1213B) may be spatially close to and may move with the object (e.g. 1212) during the prior movement of the object (e.g. 1212). At the initial time (e.g. 1216), the "other one" of the second Type 1 heterogeneous device (e.g. 1206A, 1206B, 1208, 1209, 1213A, 1213B) and the second Type 2 heterogeneous device (e.g. 1206A, 1206B, 1208, 1209, 1213A, 1213B) may have a directional antenna. The initial spatial-temporal information (e.g. initial position 1214) of the object (e.g. 1212) at the initial time (e.g. 1216) may be determined (e.g. by an object tracking server, the processor (e.g. 1200A, 1200B), the Type 1 heterogeneous device (e.g. 1206A, 1206B, 1208, 1209, 1213A, 1213B), the Type 2 heterogeneous device (e.g. 1206A, 1206B, 1208, 1209, 1213A, 1213B), and/or another device) to be a known location associated with the other one of the second Type 1 heterogeneous device (e.g. 1206A, 1206B, 1208, 1209, 1213A, 1213B) and the second Type 2 heterogeneous device (e.g. 1206A, 1206B, 1208, 1209, 1213A, 1213B) with the directional antenna.

As an example, the "one" of the second Type 1 heterogeneous device (e.g. 1206A, 1206B, 1208, 1209, 1213A, 1213B) and the second Type 2 heterogeneous device (e.g. 1206A, 1206B, 1208, 1209, 1213A, 1213B) may be module1 1206A and/or wireless transmitter (e.g. 1208) while the "other one" of the second Type 1 heterogeneous device (e.g. 1206A, 1206B, 1208, 1209, 1213A, 1213B) and the second Type 2 heterogeneous device (e.g. 1206A, 1206B, 1208, 1209, 1213A, 1213B) may be module2 1206B and/or wireless receiver (e.g. 1209). The "one" may be a smart phone and/or other portable gadget. The object (e.g. 1212) may be a person. The object (e.g. 1212) (the person) may be carrying the "one" (the smart phone, spatially close to the person) as the object (e.g. 1212) (the person) moves around. The prior movement (e.g. walking) may be the person with the smart phone entering the venue (e.g. 1242) (e.g. an airport, a terminal, a mall, a supermarket, etc.). Thus the "one" may be spatially close to the object (e.g. 1212) and may move with the object (e.g. 1212) during the prior movement of the object (e.g. 1212). a smart phone or another portable device spatially close to the object (e.g. 1212) (e.g. a person).

The "other one" may be installed at the top or at the side or at the bottom or around or near the entrance. The directional antenna of the "other one" may be aiming/pointing at the entrance such that a special signal would be pick up when the "one" carried by the object (e.g. 1212) passes through the entrance. The initial time (e.g. 1216) may be the moment the person passes through the entrance. As the beam (the cone-shape coverage) of the directional antenna may be narrow (e.g. compared with the speed of the human movement), the special signal may be strong for a short period of time (e.g. 0.2 second). The initial time (e.g. 1216) may be determined as a characteristics point of the time period (e.g. mid-point). The initial spatial-temporal information (e.g. initial position 1214) of the person at the initial time (e.g. 1216) may be the location of the entrance, or a predefined location near the entrance.

At a current time during the movement of the object (e.g. 1212), "one" of the first Type 1 heterogeneous device (e.g. 1206A, 1206B, 1208, 1209, 1213A, 1213B) and the first Type 2 heterogeneous device (e.g. 1206A, 1206B, 1208, 1209, 1213A, 1213B) may be spatially close to and may move with the object (e.g. 1212) during the movement of the object (e.g. 1212). The "one" may be a smart phone. The object (e.g. 1212) may be a person. The person may be carrying the smart phone. The movement of the object (e.g. 1212) may be the person walk around a venue (e.g. 1242) (e.g. a mall). The "one" (e.g. the smart phone) may be spatially close to and/or may move with the object (e.g. 1212) (e.g. the person) during the movement of the object (e.g. 1212).

The current time may be real time during the movement of the object (e.g. 1212). For example, the initial time (e.g. 1216) may be seconds, minutes, hours, days, weeks, months, and/or years before the current time.

At the current time, "one" of the first Type 1 heterogeneous device (e.g. 1206A, 1206B, 1208, 1209, 1213A, 1213B) and the first Type 2 heterogeneous device (e.g. 1206A, 1206B, 1208, 1209, 1213A, 1213B) may be communicatively coupled with a network server, and/or may be communicatively coupled with a local device (e.g. 1206A, 1206B, 1208, 1209, 1213A, 1213B) that may be communicatively coupled with the network server. The "one" and/or the local device (e.g. 1206A, 1206B, 1208, 1209, 1213A, 1213B) may be connected to a cloud server in the internet using 2.5G/3G/4G/LTE/5G/6G, WiFi, WiMax, Zigbee, Bluetooth, BLE, wireless network, etc. The "one" may connect to the cloud server via the local device (e.g. 1206A, 1206B, 1208, 1209, 1213A, 1213B) by connecting to the local device (e.g. 1206A, 1206B, 1208, 1209, 1213A, 1213B) which is in turn connected to the cloud server.

When the "one" (e.g. smart phone, portable/moveable device, portable gadget communicatively coupled with the smart phone via WiFi and/or BLE and/or other communication channels or a portable device) moves with the object (e.g. 1212) (e.g. a person) in the venue (e.g. 1242) (e.g. a mall), the movement of the object (e.g. 1212) and/or the "one" may impact the wireless signal (e.g. 1240) passing through the wireless multipath channel (e.g. 1244) associated with the venue (e.g. 1242) such that the object (e.g. 1212) position (e.g. 1214, 1215B, 1215A, 1217, 1219) may be tracked based on the channel information (e.g. 1211A, 1211B) derived/extracted/obtained/computed from the wireless signal (e.g. 1240).

The local device (e.g. 1206A, 1206B, 1208, 1209, 1213A, 1213B) may be: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internetenabled device, a computer, a portable computer, a tablet, a smart house, a smart office, a smart building, a smart parking lot, a smart system, and/or another device.

As an example, the object (e.g. 1212) may be at a current location L1 (e.g. new position 1215B) at a current time T1 (e.g. current time t_N 1230) Immediately before the current time T1 (e.g. 1230), the object (e.g. 1212) may be at an immediately past location L0 (e.g. immediately past position 1215A) at an immediately past time T0 (e.g. immediately past time t_{N−1} 1232). "One" of the Type 1 heterogeneous device (e.g. 1206A, 1206B, 1208, 1209, 1213A, 1213B) and the Type 2 heterogeneous device (e.g. 1206A, 1206B, 1208, 1209, 1213A, 1213B) may be spatially close to the object (e.g. 1212) and may move with the object (e.g. 1212). The "one" may comprise two antennas A1 and A2 spatially close to each other. The distance between A1 and A2 may be d. The time difference between T1 and T0 may be t=T1−T0. The line connecting A1 and A2 is a direction theta.

At the immediately past time T0 (e.g. 1232) when the object (e.g. 1212) may be at the immediately past location L0 (e.g. 1215A), the two antennas A1 and A2 may be at locations L0A1 and L0A2 respectively, both of which may be close to L0 (e.g. 1215A). At time T0, a channel information CI0A1 associated with the antenna A1 may be obtained, and a channel information CI0A2 associated with the antenna A2 may be obtained.

At the current time T1 (e.g. 1230) when the object (e.g. 1212) may be at the current location L1 (E.g. 1215B), the two antennas A1 and A2 may be at locations L1A1 and L1A2 respectively, both of which may be close to L1 (e.g. 1215B). At time T1, a channel information CI1A1 associated with the antenna A1 may be obtained, and a channel information CI1A associated with the antenna A2 may be obtained.

The spatial-temporal information of the object may be determined based on CI0A1, CI0A2, CI1A1, and CI1A2. The spatial-temporal information may comprise at least one of: a displacement, a distance, a direction, a speed, an acceleration of a current movement (e.g. current movement 1220). The CI1A1 and CI1A2 may be compared with CI0A1 and CI0A2.

If CI1A1 may match CI0A2 (e.g. with a similarity score larger than some threshold), it may be an indication that the antenna A2 (and the "one" and the object itself) may have moved from location L0A2 at time T0 to location L1A1 at time T1. The distance (i.e. the spatial-temporal information) may be determined as d, the distance between the antennas A1 and A2, i.e. distance between L0A2 and L1A1. The speed may be determined as the distance d divided by the time t=T1−T0, i.e. speed=d/(T1−T0). The axis of motion may be determined as the axis connecting antennas A1 and A2. The direction may be determined as the direction from antenna A2 to A1 (e.g. theta).

If CI1A2 may match CI0A1 (e.g. with similarity score larger than some threshold), it may be an indication that the antenna A1 (and the "one" and the object itself) may have moved from location L0A1 at time T0 to location L1A2 at time T1. The distance (i.e. the spatial-temporal information) may be determined as d, the distance between the antennas A1 and A2, i.e. distance between L0A1 and L1A2. The speed may be determined as the distance d divided by the time t=T1−T0, i.e. speed=d/(T1−T0). The axis of motion may be determined as the axis connecting antennas A1 and A2. The direction may be determined as the direction from antenna A1 to A2.

In one embodiment, a system comprises a first wireless transceiver of a first device, and at least one second wireless transceiver of at least one second device. The first wireless transceiver of the first device is wirelessly coupled to the at least one second wireless transceiver through a wireless multipath channel associated with a space.

The first wireless transceiver and the at least one second device may be heterogeneous. They may have different hardware, different hardware architecture, different electronic circuits, different electronic components, different integrated circuit (IC), different processor, different memory, different bus, different generation of manufacturing technique, different clock circuitry, different clock frequency, different power supply, different voltage, different fabrication/manufacturing technologies, different form factor, different interface circuitry, different network circuitry, different software, different firmware, different network interface, and/or different manufacturer, etc. In other words, the first wireless transceiver can be called the first heterogeneous wireless transceiver, or Type 1 wireless transceiver. The second heterogeneous wireless transceiver can be called the second heterogeneous wireless transceiver, or Type 2 wireless transceiver. When there are more than one Type 2 wireless transceivers, they may be heterogeneous among themselves also.

The wireless coupling may be based on mobile network, 2.5G/3G/3.5G/4G/LTE/5G/6G/7G/8G, local area network, WiFi, WiMax, Zigbee, Bluetooth, BLE, wireless network, mesh network, etc.

The first device with the first wireless transceiver comprises a processor and a memory which are configured to obtain a set of channel information (CI) and perform a task associated with the space based on the set of channel information. The set of channel information is captured when at least one probing signal is either (1) sent from the first wireless transceiver to a particular second wireless transceiver through the wireless multipath channel associated with the space, or (2) sent from the particular second wireless transceiver to the first wireless transceiver through the wireless multipath channel. The set of CI comprises a channel impulse response, a channel frequency response, a channel profile, and/or another channel data of the wireless multipath channel.

The first device and/or any second device may be powered by direct current (e.g. battery), or by alternative current (AC). The first device may be a household/office device such as network device (e.g. mobile network base station, 3G/4G/5G/6G/7G/8G mobile device, mobile phone, smart phone, mobile dongle, LTE device, WiFi device, broadband device, router, Bluetooth device, BLE device, Zigbee device, ultra-wide-band device, etc.), computing device (e.g. computer, laptop, notebook, electronic pad (e.g. iPad), printer, scanner, mouse, mouse pad, keyboard, USB device, Bluetooth device), speaker, refrigerator, lamp, media playback/record device (e.g. audio system, video system, A/V system, television, radio, satellite dish system, cable system, telephone system, HiFi, DVD player), media recording device (e.g. HiFi), communicative device (e.g. television, telephone, mobile phone), surveillance system (e.g. security camera, motion sensor, contact sensor, other sensors, control unit, etc.), climate control system (e.g. thermostat, fan, air conditioner, heater, cooler, sensors, control unit, etc.).

The first device and/or any second device may be connected to the internet using mobile network, 2.5G/3G/3.5G/4G/LTE/5G/6G/7G/8G, WiFi, WiMax, Zigbee, Bluetooth, BLE, wireless network, mesh network, etc.

The space may be a rich-scattering wireless environment, such as an indoor environment or urban metropolitan area, enclosed environment, underground environment, open-air venue with barriers such as parking lot, storage, yard, square, forest, cavern, valley, etc.

The task may comprise determining a characteristics of an object, the characteristics being: a frequency of pseudo-periodic motion, a frequency characteristics, a frequency spectrum, a time period of pseudo periodic motion, a temporal characteristics, a temporal profile, a timing of pseudo-periodic motion, a starting time, an ending time, a duration, a history of motion, a motion type, a motion classification, a location of the object, a speed, a displacement, an acceleration, a rotational speed, a rotational characteristics, a gait cycle of the object, a transient behavior of the object, a transient motion, a change in pseudo-periodic motion, a change in frequency of pseudo-periodic motion, a change in gait cycle, an event associated with pseudo-periodic motion, an event associated with transient motion, a sudden-motion event, a fall-down event, and another information.

Computation workload associated with the task may be shared/distributed/allocated among the processor of the first device, multiple cores/threads of the processor, other processors/DSP/microcontroller/ASIC/parallel processors/co-processors of the first device, at least one processor associated with the at least one second device, a cloud server, a fog server, an edge server, a local server, and/or another device. The task may be modular such that different module is performed by different processors.

The task may be adaptively adjusted, changed and/or modified based on locations of the objects associated with the task, orientations of the objects, directions of the objects, a change in amount/state/characteristics/nature/behavior of objects associated with the task, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

Part of the task may be performed in a "time domain", a frequency domain and/or a time-frequency domain. The "time domain" may be associated with any 1-dimensional quantity such as time, timing, duration, time window, sliding time window, length, distance, angle, amount, a countable quantity, etc. The frequency domain may be a domain associated with Fourier transform, Laplace transform, Hadamard transform, Hilbert transform, sine transform, cosine transform, triangular transform, wavelet transform, integer transform, power-of-2 transform, combined zero padding and transform, a transform combined with zero padding, an inverse transform, and/or another transform. Fast, simplified, and/or approximated versions of the transform may be performed. The transform and/or inverse transform may be performed using floating point, and/or fixed point arithmetic.

The set of channel information, and/or a quantity based on the set of channel information may be stored in the memory of the first device, at least one memory of the at least one second device, a storage device associated with the first device and/or the at least one second device, a storage device communicatively coupled with the first device and/or the at least one second device, a local storage device, an edge storage device, a remote storage device, a fog storage device, a cloud storage device, a distributed storage system, a storage network, etc.

The set of channel information and/or a set of quantity based on the set of channel information may be pre-processed.

The set of channel information may be time-corrected. Time stamps associated with the set of channel information may not be uniformly spaced in time. Time correction may be performed so that the corrected time stamps are uniformly spaced in time.

The object may be a user, a car, a fan, a device, a machine, etc.

The set of channel information (CI) and/or a quantity computed based on the set of channel information may be stored. They may be stored in the memory of the first device, in a storage device communicatively coupled with the first device, or in a cloud storage device.

The set of channel information (CI) and/or the quantity computed based on the set of channel information may be pre-processed. The pre-processing may be performed in a frequency domain, a time domain, and/or a time-frequency domain.

The set of channel information (CI) and/or the quantity computed based on the set of channel information may be cleaned. The cleaning may be performed in a frequency domain, a time domain, and/or a time-frequency domain.

The set of channel information (CI) and/or the quantity computed based on the set of channel information may be normalized. The normalization may be performed in a frequency domain, a time domain, and/or a time-frequency domain.

The set of channel information (CI) and/or the quantity computed based on the set of channel information may be transmitted to another device, a local server, a cloud server, a server in the cloud, and/or a fog server communicatively coupled with a cloud server. The transmission may be through a network.

In another embodiment, a method of a system comprises obtaining a set of channel information (CI) using a processor and a memory of a first device of the system, and performing a task associated with a space based on the set of channel information. The first wireless transceiver of the first device is wirelessly coupled to at least one second wireless transceiver of at least one second device of the system through a wireless multipath channel associated with the space. The set of channel information is captured when at least one probing signal is either (1) sent from the first wireless transceiver to a particular second wireless transceiver through the wireless multipath channel associated with the space, or (2) sent from the particular second wireless transceiver to the first wireless transceiver through the wireless multipath channel. The set of CI comprises a channel impulse response, a channel frequency response, a channel profile, and/or another channel data of the wireless multipath channel.

In yet another embodiment, a first device of a system comprises a first wireless transceiver, a processor, a memory communicatively coupled with the processor, and a set of instructions stored in the memory. The first wireless transceiver is wirelessly coupled to at least one second wireless transceiver of at least one second device of the system through a wireless multipath channel associated with a space.

The set of instructions, when executed by the processor, cause the first device to obtain a set of channel information (CI) and perform a task associated with the space based on the set of channel information. The set of channel information is captured when at least one probing signal is either sent from the first wireless transceiver to a particular second wireless transceiver through the wireless multipath channel associated with the space, or sent from the particular second wireless transceiver to the first wireless transceiver through the wireless multipath channel. The set of CI may comprise at least one of: a channel impulse response, a channel frequency response, a channel profile, and another channel data of the wireless multipath channel.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments can also be implemented in combination in a single embodiment. Conversely, various features that are described in the context of a single embodiment can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a first wireless transceiver of a first device wirelessly coupled to at least one second. wireless transceiver through a wireless multipath channel associated with a space; and
   the at least one second wireless transceiver of at least one second device,
   wherein the first device comprises a processor and a memory configured to:
   obtain a set of channel information (CI) captured when at least one probing signal is at least one of:
      sent from the first wireless transceiver to a particular second wireless transceiver through the wireless multipath channel associated with the space, and
      sent from the particular second wireless transceiver to the first wireless transceiver through the wireless multipath channel,
      wherein the set of CI comprises at least one of: a channel impulse response, a channel frequency response, a channel profile, and another channel data of the wireless multipath channel,
   perform a task associated with an object in the space based on the set of CI and a reference parameter associated with a state, and
   update the reference parameter based on a threshold and a similarity score of the set of CI collected in the state,
   wherein the task comprises determining a characteristics of the object, the characteristics being at least one of:
      a frequency of a pseudo-periodic motion of the object, a frequency characteristics, a frequency spectrum, a time period of the pseudo periodic motion, a temporal characteristics, a temporal profile, a timing of the pseudo-periodic motion,
      a motion type of a motion of the object, a motion classification, a starting time, an ending time, a duration, a history of motion,
      a location of the object, a speed, a displacement, an acceleration, a rotational speed, a rotational characteristics, a gait cycle of the object,
      a transient behavior of the object, a transient motion, a change in pseudo-periodic motion, a change in frequency of pseudo-periodic motion, a change in gait cycle,
      an event associated with the pseudo-periodic motion, an event associated with the transient motion, a sudden-motion event, or a fall-down event associated with the object.

2. The system of claim 1:
   wherein at least one of: the set of CI and a quantity computed based on the set of CI, is being stored.

3. The system of claim 1:
wherein at least one of: the set of CI and a quantity computed based on the set of CI, is being stored in a storage device communicatively coupled with the first device.

4. The system of claim 1:
wherein at least one of: the set of CI and a quantity computed based on the set of CI, is being stored in a cloud storage device.

5. The system of claim 1:
wherein the set of CI is being pre-processed.

6. The system of claim 1:
wherein the set of CI is being pre-processed in a frequency domain.

7. The system of claim 1:
wherein the set of CI is being pre-processed in a time domain.

8. The system of claim 1:
wherein the set of CI is being pre-processed in a time-frequency domain.

9. The system of claim 1:
wherein the phase of the set of CI is being cleaned.

10. The system of claim 1:
wherein the phase of the set of CI is being cleaned in a frequency domain.

11. The system of claim 1:
wherein a particular CI is being normalized.

12. The system of claim 1:
wherein a particular CI is being normalized in the frequency domain.

13. The system of claim 1:
wherein the set of CI is being transmitted to another device.

14. The system of claim 1:
wherein the set of CI is being transmitted to another device through a network.

15. The system of claim 1:
wherein the set of CI is being transmitted to a server in the cloud.

16. The system of claim 1:
wherein the set of CI is being transmitted to a local server.

17. The system of claim 1:
wherein the set of CI is being transmitted to a fog server communicatively coupled with a cloud server.

18. A method of a system, comprising:
obtaining a set of channel information (CI) using a processor and a memory of a first device of the system, wherein a first wireless transceiver of the first device is wirelessly coupled to at least one second wireless transceiver of at least one second device of the system through a wireless multipath channel associated with a space,
wherein the set of CI is captured when at least one probing signal is at least one of:
sent from the first wireless transceiver to a particular second wireless transceiver through the wireless multipath channel associated with the space, and
sent from the particular second wireless transceiver to the first wireless transceiver through the wireless multipath channel;
performing a task associated with an object in the space based on the set of CI and a reference parameter associated with a state; and
updating the reference parameter based on a threshold and a similarity score of the set of CI collected in the state, wherein the task comprises determining a characteristics of the object, the characteristics being at least one of:
a frequency of a pseudo-periodic motion of the object, a frequency characteristics, a frequency spectrum, a time period of the pseudo periodic motion, a temporal characteristics. a temporal profile, a timing of the pseudo-periodic motion,
a motion type of a motion of the object, a motion classification, a starting time an ending time, a duration, a history of motion,
a location of the object, a speed, a displacement, an acceleration, a rotational speed, a rotational characteristics, a gait cycle of the object,
a transient behavior of the object, a transient motion, a change in pseudo-periodic motion, a change in frequency of pseudo-periodic motion, a change in gait cycle, an event associated with the pseudo-periodic motion, an event associated with the transient motion, a sudden-motion event, or a fall-down event associated with the object.

19. The method of claim 18:
wherein the set of CI to comprise at least one of: a channel impulse response, a channel frequency response, a channel profile, and another channel data of the wireless multipath channel.

20. A first device of a system, comprising:
a first wireless transceiver wirelessly coupled to at least one second wireless transceiver of at least one second device of the system through a wireless multipath channel associated with a space;
a processor;
a memory communicatively coupled with the processor;
a set of instructions stored in the memory which, when executed by the processor, cause the first device to:
obtain a set of channel information) captured when at least one probing signal is at least one of:
sent from the first wireless transceiver to a particular second wireless transceiver through the wireless multipath channel associated with the space, and
sent from the particular second wireless transceiver to the first wireless transceiver through the wireless multipath channel,
wherein the set of CI comprises at least one of: a channel impulse response, a channel frequency response, a channel profile, or another channel data of the wireless multipath channel,
perform a task associated with an object in the space based on the set of CI and a reference parameter associated with a state, and
update the reference parameter based on a threshold and a similarity score of the set of CI collected in the state, wherein the task comprises determining a characteristics of the object, the characteristics being at least one of:
a frequency of a pseudo-periodic motion of the object, a frequency characteristics, a frequency spectrum, a time period of the pseudo-periodic motion, a temporal characteristics, a temporal profile, a timing of the pseudo-periodic motion,
a motion type of a motion of the object, a motion classification, a starting time, an ending time, a duration, a history of motion,
a location of the object, a speed, a displacement, an acceleration, a rotational speed, a rotational characteristics, a gait cycle of the object, a transient behavior of the object, a transient motion, a change in pseudo-periodic motion, a change in frequency of pseudo-periodic motion, a change in gait cycle, an event associated with the pseudo-periodic motion, an event associated with the transient motion, a sudden-motion event, or a fall-down event associated with the object.

\* \* \* \* \*